(12) United States Patent (10) Patent No.: US 8,762,379 B2
Birdwell et al. (45) Date of Patent: Jun. 24, 2014

(54) METHOD AND APPARATUS FOR PREDICTING OBJECT PROPERTIES AND EVENTS USING SIMILARITY-BASED INFORMATION RETRIEVAL AND MODELING

(71) Applicant: Univeristy of Tennessee Research Foundation, Knoxville, TN (US)

(72) Inventors: J. Douglas Birdwell, Oak Ridge, TN (US); Tse-Wei Wang, Oak Ridge, TN (US); David J. Icove, Knoxville, TN (US); Sally P. Horn, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 13/753,653

(22) Filed: Jan. 30, 2013

(65) Prior Publication Data

US 2013/0159310 A1 Jun. 20, 2013

Related U.S. Application Data

(63) Continuation of application No. 12/823,284, filed on Jun. 25, 2010, now Pat. No. 8,392,418.

(60) Provisional application No. 61/220,248, filed on Jun. 25, 2009.

(51) Int. Cl.
*G06F 7/00* (2006.01)
*G06F 17/30* (2006.01)

(52) U.S. Cl.
CPC ............................... *G06F 17/30424* (2013.01)
USPC .......................................................... 707/737

(58) Field of Classification Search
None
See application file for complete search history.

(56) References Cited

U.S. PATENT DOCUMENTS

| 5,781,704 | A | 7/1998 | Rossmo |
| 5,911,139 | A | 6/1999 | Jain et al. |
| 6,741,983 | B1 | 5/2004 | Birdwell et al. |

(Continued)

OTHER PUBLICATIONS

Tran, Van Tung, et al. "Machine condition prognosis based on regression trees and one-step-ahead prediction," Mechanical Systems and Signal Processing 22.5 (2008): 1179-1193.*

(Continued)

*Primary Examiner* — Jay Morrison
(74) *Attorney, Agent, or Firm* — Cameron LLP

(57) ABSTRACT

Method and apparatus for predicting properties of a target object comprise application of a search manager for analyzing parameters of a plurality of databases for a plurality of objects, the databases comprising an electrical, electromagnetic, acoustic spectral database (ESD), a micro-body assemblage database (MAD) and a database of image data whereby the databases store data objects containing identifying features, source information and information on site properties and context including time and frequency varying data. The method comprises application of multivariate statistical analysis and principal component analysis in combination with content-based image retrieval for providing two-dimensional attributes of three dimensional objects, for example, via preferential image segmentation using a tree of shapes and to predict further properties of objects by means of k-means clustering and related methods. By way of example, one of a criminal activity and a fraudulent activity event, an intrusion event and a fire event and residual objects may be predicted and located and qualified such that, for example, properties of the residual objects may be qualified, for example, via black body radiation and micro-body databases including charcoal assemblages.

52 Claims, 14 Drawing Sheets

(56) References Cited

U.S. PATENT DOCUMENTS

| | | |
|---|---|---|
| 6,778,995 B1 | 8/2004 | Gallivan |
| 7,127,372 B2 | 10/2006 | Boysworth |
| 7,149,632 B1* | 12/2006 | Gao et al. ............... 702/34 |
| 7,162,372 B2 | 1/2007 | Wang et al. |
| 7,236,971 B1 | 6/2007 | Shatdal et al. |
| 7,318,053 B1 | 1/2008 | Cha et al. |
| 7,484,132 B2* | 1/2009 | Garbow ............... 714/47.2 |
| 7,580,947 B2 | 8/2009 | Kasravi et al. |
| 7,593,909 B2 | 9/2009 | Kasravi |
| 7,624,087 B2 | 11/2009 | Birdwell et al. |
| 7,653,245 B2 | 1/2010 | Love et al. |
| 7,724,134 B2 | 5/2010 | Icove et al. |
| 7,792,770 B1* | 9/2010 | Phoha et al. ............... 706/45 |
| 8,044,798 B2 | 10/2011 | Icove et al. |
| 8,049,620 B2 | 11/2011 | Icove et al. |
| 8,271,201 B2 | 9/2012 | Chakraborty et al. |
| 8,301,392 B2 | 10/2012 | Chakraborty et al. |
| 2003/0041042 A1 | 2/2003 | Cohen et al. |
| 2003/0130855 A1 | 7/2003 | Babu et al. |
| 2003/0157525 A1 | 8/2003 | Mintier et al. |
| 2003/0200189 A1 | 10/2003 | Meng et al. |
| 2005/0039036 A1* | 2/2005 | Eisen ............... 713/193 |
| 2005/0055351 A1 | 3/2005 | Barton et al. |
| 2005/0182712 A1 | 8/2005 | Angell |
| 2006/0020391 A1 | 1/2006 | Kreiswirth et al. |
| 2006/0120411 A1 | 6/2006 | Basu et al. |
| 2006/0271311 A1* | 11/2006 | Gao et al. ............... 702/34 |
| 2007/0011146 A1 | 1/2007 | Holbrook |
| 2007/0073664 A1 | 3/2007 | Ahn |
| 2007/0124276 A1 | 5/2007 | Weissman et al. |
| 2007/0226640 A1 | 9/2007 | Holbrook |
| 2007/0271278 A1 | 11/2007 | Acharya |
| 2007/0282827 A1 | 12/2007 | Levin |
| 2008/0146334 A1 | 6/2008 | Kil |
| 2008/0147441 A1 | 6/2008 | Kil |
| 2008/0294275 A1 | 11/2008 | Reichard et al. |
| 2009/0030864 A1 | 1/2009 | Pednault et al. |
| 2009/0034824 A1 | 2/2009 | Li et al. |
| 2009/0044279 A1* | 2/2009 | Crawford et al. ............... 726/26 |
| 2009/0119244 A1 | 5/2009 | Chimenti et al. |
| 2009/0144122 A1 | 6/2009 | Ginsberg et al. |
| 2009/0177496 A1 | 7/2009 | Tuck et al. |
| 2009/0204551 A1* | 8/2009 | Wang et al. ............... 705/400 |
| 2010/0004981 A1* | 1/2010 | Katz et al. ............... 705/11 |
| 2010/0083382 A1* | 4/2010 | Farley et al. ............... 726/24 |
| 2010/0322471 A1* | 12/2010 | Treado et al. ............... 382/103 |

OTHER PUBLICATIONS

Kim, Hack-Eun, et al. "Machine prognostics based on health state estimation using SVM." (2008): 834-845.*

Liu, Ting, Charles Rosenberg, and Henry A. Rowley, "Clustering billions of images with large scale nearest neighbor search," IEEE Workshop on Applications of Computer Vision, 2007, WACV'07, IEEE, Feb. 2007.*

Haining, "Exploratory Spatial Data Analysis in a Geographic System," The Statistician 47, Part 3, 1998, pp. 457-469.

J. Fan et al., "Hierarchical Classification for Automatic Image Automation," SGIR '07 Proceedings, Jul. 23, 2007, pp. 111-118, Amsterdam, NE.

S. Wei et al., "Applications of Numerical Optimal Control to Nonlinear Hybrid Systems," Nonlinear Analysis: Hybrid Systems 1 (2007), pp. 264-279.

C. Garcia et al., "Quadratic Programming Solution of Dynamic Matrix Control (QDMC)," Chemical Engineering Communications, vol. 46, Issue 1-3, Jul. 1986, pp. 73-87, Abstract.

M. Plawecki et al., "Improved Transformation of Morphometric Measurements for a Priori Parameter Estimation in a Physiologically-Based Pharmacokinetic Model of Ethanol," 2007.

M. Morari et al., "Model Predictive Control: Past, Present and Future," Computers and Chemical Engineering 23 (1999), pp. 667-682.

B. Moerdyk et al., "Hybrid Optimal Control for Load Balancing in a Cluster of Computer Nodes," Pro. of the IEEE 2006 IEEE Int. Conf. on Control App., pp. 1713-1718.

S. P. Boyd et al., "A New CAD Method and Associated Architectures for Linear Controllers," IEEE Trans. on Automatic Control, V. 33, N. 3, 1988, pp. 268-283.

Icove, David J., "Atomated Crime Profiling," FBI Law Enforcement Bulletin, 1986, pp. 27-30.

Bennell, C. et al, "The Impact of Data Degrad. and Sample Size on the Perform. of Two Simil. Coef.'s Used in Behavior Linkage Analysis," Forens. Sci. Int. 199, 2010, pp. 85-92.

Z. Shen, Database Similarity Search in Metric Spaces: Limitations and Opportunities, MS Thesis, Electrical Engineering, University of Tennessee, Aug. 2004.

L. M. Kennedy, S.P. Horn, and K. H. Orvis, "A 4000-yr record of fire and forest history from Valle de Bao, Cordillera Central, Dominican Republic," Palaeogeography, Palaeoecology, Palaeoclimatology 231 (1996), pp. 279-290.

K. A. Haberyan, S. P. Horn, and B. F. Cumming, "Diatom assemblages from Costa Rican lakes: An initial ecological assessment," Journal of Paleolimnology 17 (1997), pp. 263-274.

Y. Pan, J. D. Birdwell and S. M. Djouadi, "Preferential image segmentation using trees of shapes," IEEE Trans. Image Processing, 18 (2009), pp. 854-866.

S. Benson, C. Lennard, P. Maynard, and C. Roux, "Forensic applications of isotope ratio mass spectrometry—a review," Forensic Science International 157, (2006), pp. 1-22.

Bengea et al., "Optimal Control of Switching Systems," Automatica 41, (2005), pp. 11-27.

Bengea et al., Optimal and Suboptimal Control of Switching Systems, Proceedings of the 42nd IEEE Conference on Decision and Control, (2003), pp. 5295-5300.

S. Boyd et al., Linear Matrix Inequalities in System and Control Theory, Society for Industrial Mathematics (1997), ISBN 978-0898714852.

K. Anchukaitis and S. P. Horn, A 2000-year reconstruction of forest disturbance from southern Pacific Costa Rica, Palaeogeography, Palaeoclimatology, Palaeoecology 221 (2005), pp. 35-54.

R. C. Elston and J. Stewart, A General Model for the Genetic Analysis of Pedigree Data, Human Heredity 21 (1971), pp. 523-542.

P. C. Mahalanobis, "On the generalised distance in statistics," Proceedings of the National Institute of Science, India, vol. 2, pp. 49-55, Apr. 1936.

Z. Huang, "Extensions to the k-means Algorithm for Clustering Large Data Sets with Categorical Values," Data Mining and Knowledge Discovery 2, (1998), pp. 283-304.

F. Aurenhammer, "Voronoi diagrams: a survey of a fundamental geometric data structure," ACM Comp. Surveys (CSUR), 23 (3) 1991, pp. 345-405.

C. Shen, K.-B. Liu, L. Tang, and J. T. Overpeck, "Numerical analysis of modern and fossil pollen data from the Tibetan Plateau," Annals of the Association of American Geographers 98 (2008), pp. 755-772.

J. Ross Quinlan, "Induction of decision trees," Machine Learning 1, (1986), pp. 81-106.

A. Oakly, "A Database Management System for Vision Applications," Proceedings of the Conference on British Machine Vision, vol. 2, (1994), pp. 629-639.

L. A. Milne, V. M. Bryant Jr., and D. C. Mildenhall, "Forensic palynology," in Forensic Botany: Principles and Applications to Criminal Casework, H. M. Coyle (ed.), CRC Press, Boca Raton, FL, 2005, pp. 217-252.

W. A. Burkhard and R. M. Keller, "Some approaches to best-match file searching," Comm. ACM, 16 (4) 1973, pp. 230-236.

P. Yianilos, "Data structures and algorithms for nearest neighbor search in general metric spaces," Proc. of the 4th Annual ACM-SIAM Symp. on Discrete Algorithms, Austin, TX, 1993, pp. 311-321.

W. L. G. Koontz, P. M. Narendra, and K. Fukunaga, "A branch and bound clustering algorithm," IEEE Trans. Comp., C 24, 1975, pp. 908-915.

J. T. Tou and R. C. Gonzalez, Pattern Recognition Principles, Addison-Wesley, Reading, MA, 1981 printing.

(56) References Cited

OTHER PUBLICATIONS

D. J. Icove et al., Application of Pattern Recognition in Arson Ivestigation, Fire Technology, pp. 35-41, 1975.

David J. Icove, Principles of Incendiary Crime Analysis, PhD Dissertation, University of Tennessee, Knoxville, 155 pp. 1979.

D. J. Icove et al, Motive-Based Offender Profiles of Arson and Fire-Related Crimes, FBI Law Enforcement Bulletin, pp. 17-23, Apr. 1987.

J. E. Douglas et al., Criminal Profiling from Crime Scene Analysis, Behavorial Sciences and the Law, vol. 4, No. 4, pp. 401-421, 1986.

Anne Davies, Rapists' Behavior: A Three Aspect Model as a Basis for Analysis and the Identification of Serial Crime, Forensic Science International, 55, 1992, pp. 173-194.

Allen D. Sapp et al., A Report of Essential Findings from a Study of Serial Arsonists, National Center for the Anaalysis of Violent Crime, FBI, Qunatico, VA, 113 pages, 1994.

* cited by examiner

IMAGE FROM TARGET SAMPLE    REFERENCE IMAGES AND DATA    POLLEN ASSEMBLAGE

PARTITION AT LEVEL 1      PARTITION AT LEVEL 2

FINAL PARTITION

METHOD AND APPARATUS FOR PREDICTING OBJECT PROPERTIES AND EVENTS USING SIMILARITY-BASED INFORMATION RETRIEVAL AND MODELING

This application is a divisional of U.S. patent application Ser. No. 12/823,284 filed Jun. 25, 2010 (now allowed) which claims priority to provisional U.S. Application Ser. No. 61/220,248 filed Jun. 25, 2009, the entire disclosures of which are hereby incorporated by reference into the present application.

TECHNICAL FIELD

The technical field relates to a method and apparatus for predicting object properties and events using similarity-based information retrieval and modeling and, in particular, to the application of database and modeling software supporting model-based inference of properties of object data and events involving the objects recorded in a plurality of databases of information collected from previously analyzed objects and samples of objects including a prediction of an event, of consumer fraud or criminal activity.

BACKGROUND AND RELATED ARTS

Database systems and search and retrieval from such databases are known. For example, U.S. Pat. No. 5,911,139 to Jain et al. describes a visual image database search engine which allows for different schema. A schema is a specific collection of primitives to be processed and a corresponding feature vector is used for similarity scoring. In particular, a system and method for content-based search and retrieval of visual objects computes a distance between two feature vectors in a comparison process to generate a similarity score.

U.S. Pat. No. 6,778,995 to Gallivan describes a system and method for efficiently generating cluster groupings in a multi-dimensional concept space. A plurality of terms is extracted from documents of a collection of stored, unstructured documents. A concept space is built over the collection and terms correlated between documents such that a vector may be mapped for each correlated term. Referring to FIG. 14 of the '995 patent, a cluster is populated with documents having vector differences falling within a predetermined variance such that a view may be generated of overlapping clusters.

U.S. Pat. No. 7,127,372 to Boysworth describes an improved regression-based qualitative analysis algorithm when a mixture, not in a library of spectra, and being an "unknown" is subjected to regression analysis of "peaks" in a residual error computed between an estimated spectrum and a measured spectrum. The process is repeated using information from a retro-regression.

U.S. Pat. No. 7,236,971 to Shatdal et al. describes a method and system for deriving data through interpolation in a database system. A parallel database system has plural processing units capable of performing interpolation of data in parallel.

U.S. Pat. No. 7,318,053 to Cha et al. describes an indexing system and method for nearest neighbor searches in high dimensional databases using vectors representing objects in n-dimensional space and local polar coordinates for vectors such that a query data vector is requested to find "k" nearest neighbors to the query vector of the vectors in the n-dimensional space.

Haining, "Exploratory Spatial Data Analysis in a Geographic Information System," *The Statistician* 47, Part 3, 457-469 (1998) describes a software system involving the exploratory spatial data analysis features of the ARC/INFO geographical information system and identifies spatial patterns of geographic locations.

With respect to crime analysis in the twentieth century, two of the most important scientific developments include fingerprint and DNA analysis. Fingerprint analysis has resulted, for example, in the Automatic Fingerprint Identification System or AFIS, and DNA analysis has resulted, for example, at the federal level, in the development of the CODIS database of DNA profiles which are relevant to crime scene investigation and offender profiling and matching. Over the years, fuzzy logic, artificial intelligence, neural networks, data mining, linkage analysis, geographic and time of incident graphical analysis and even Bayesian networks have been used to identify patterns in different types of crimes (arson, burglary, murder, sexual assault among others) and to study these crime types by performing linkage analysis among, modus operandi or MO, crime signatures (e.g., always taking a trophy), ritual, and intentional deception by the offender. There has been a dialog in the literature between those advocating a Hercule Poirot human inference model versus a more scientific-based model for criminal profiling, especially profiling serial offenders (individuals or groups of individuals). David J. Icove et al., in his article "Application of Pattern Recognition in Arson Investigation." *Fire Technology*, pp. 35-41, 1975 highlights a study conducted with the Prince George's County Fire Department, in which there is discussed the application of pattern recognition methods to the development of techniques for aiding an arson investigator in determining trends in incendiary and suspicious fires. Dr. Trove further developed an algorithm for crime pattern recognition at the University of Tennessee and published "Principles of incendiary Crime Analysis," June. 1979, in which Dr. Icove discusses a model called an arson pattern recognition system (ARPS) for arson-fraud crimes which comprises 1) detection 2) prediction and 3) prevention. The model involves the investigation of an intentional incendiary event and adding object data to a database to continuously improve prevention and prediction of individual arsonists and groups of arsonists. Further work by Dr. Icove is discussed in his publications: "Automated Crime Profiling," *FBI Law Enforcement Bulletin*, pp. 27-30, 1986 and his "Motive-Based Offender Profiles of Arson and Fire-Related Crimes," FBI Law Enforcement Bulletin, pp. 17-23, 1987. In particular, the 1986 automated crime profiling article suggests a system depicted in FIG. 22 (PRIOR ART). 1) Violent crime incidents are reported and via 2) media reports, 3) crime scene processing and 4) VICAP crime reports and 5) violent crime research data are used to build 6) an artificial intelligence system. The artificial intelligence system outputs 7) crime scene profiles and 8) strategic and training implications which are then input to 1) violent crime incident investigation. Trove claims that 1) useless investigative paths may be eliminated, 2) similar profiles, case studies and the like may be preserved and recalled, 3) complex criminal network problems may be displayed. 4) decision rules accelerate processing time, 5) the expert system will output useful information based on the knowledge base, and 6) complex criminal problems may be solved, The arson study included data such as day of week, time of day, full/new moon and so arson crimes of juvenile offenders were identified. Also, in 1986, "Criminal Profiling from Crime Scene Analysis," Douglas et al., *Behavioral Sciences and the Law*, vol. 4, no. 4, pp. 401-421, suggests in FIG. 1 thereof a criminal profiling process which involves "Decision Process Models" as element 2 of a complex feedback process similar to that of FIG. 22 (PRIOR ART) of Icove, but an emphasis is placed more on the human criminal profiler than on the use of an intelligent pattern recognition modeling. Anne Davies in her article. "Rapists' Behavior: A Three Aspect Model as a Basis for Analysis and the Identification of Serial Crime," *Forensic Science International,* 55, 1992. pp. 173-194, suggests a behavioral model broken into three "aspects" which are modus operandi, sexual and personal gratification and attitude and intimacy. These, in turn, are broken down into twenty-three attributes ranging from choice of time and location under modus operandi to use of "compliments" under attitude and intimacy. Most recently, referring to FIG. 23 (PRIOR ART), Craig Bennell et al., in "the Impact of Data Degradation and Sample Size on the Performance of Two Similarity Coefficients used in Behavioral Linkage Analysis," *Forensic Science International,* 199, 2010, pp. 85-92, (received 17 Jun. 2009 and prior art to the extent of the 17 Jun. 2009 version or public use earlier than 25 Jun. 2009) shows a more detailed behavioral hierarchy at four levels and comprising thirty-six attributes at its deepest level from a blitz attack under control behaviors to steals personal items under theft behaviors, the behaviors further including escape behaviors and sexual behaviors. The Federal Bureau of Investigation (FBI) later published: "A Report of Essential Findings from a Study of Serial Arsonists," Allen D. Sapp et al. (including Dr. Icove), 1994 (113 pages). In this detailed study of criminal arson activity patterns, findings include attributes of serial arsonists such as age, gender, race, physical attributes, marital status, marital history, education, occupation, military record, intelligence quotient and sexual preference. Moreover, the life history of subjects resulted in findings such as criminal history, institutional history, medical history, psychological history including suicide attempts, work history, social and family histories and the like. Motives were characterized as vandalism, revenge, excitement, crime concealment, profit and so on. Numerous tables provide details such as the quantitative result that, of 39 cases studied of serial arsonists, 28.2% of these arsonists were classified as "menial laborer" and 23.1% were classified as "skilled laborer." U.S. Pat. No. 5,781,704 issued Jul. 14, 1998, to Rossmo, describes "An Expert System Method of Performing Crime Site Analysis." Rossmo suggests utilizing the Manhattan distance as one means of ascertaining a probable location of a criminal and showing probability of the criminal being at the location.

Other systems and database technologies are known which incorporate multivariate statistical analysis and, in particular, principal component analysis, from patent and non-patent literature and other technologies which utilize a geographic information system (GIS).

SUMMARY OF THE PREFERRED EMBODIMENTS

In accordance with an embodiment of a method and apparatus for predicting object properties using similarity-based information retrieval and modeling and an aspect thereof, database and modeling technologies can infer properties, for example, material composition, manufacturer, recognition of a human, recognition of vegetation, combustion product composition, fire causation and geographic information among other object properties of objects collected about the world from similar previously analyzed objects collected about the world and having their properties stored in a database. Measurable properties of the objects may be stored in one or a plurality of databases including multi-dimensional databases. While exact matches to reference data may not be expected in response to a query for a similar object given a target object under investigation, an automated search strategy may locate nearest neighbor items, or items within a specified neighborhood, with the most similar properties, from a reference collection and utilize any geographic or other information associated with these items to predict properties. Models are then utilized to predict properties of the objects from the similar data. The term "object" is intended to incorporate micro to macro size objects as well as human and animal objects and remains thereof having three dimensional shape and properties that may include any of the following: temperature, pressure, texture, shape, color, time or frequency varying data, acoustic, radio frequency spectral data, tissue type, morphology, genetic information, phenotypes, image data and the like. Correlations may be with geographic features, such as proximity to a body of water, ancient lakebeds, or particular types of vegetation, identity of manufacturer or builder, object identification or signature characteristics, human identification or characteristics and the like, so an estimate is desired of the physical or ethnic source or origin or the likely characteristics of the source or origin of a target object.

A plurality of databases and a modeling and search capability extends and exploits already patented similarity-based indexing and search technologies developed at the University of Tennessee. The following patents and published applications as well as those identified above in the Background section are incorporated by reference as to their entire contents: U.S. Pat. Nos. 7,162,372 and 7,672,790 directed to a method of DNA mixtures; PCT published patent application WO 2007/0244408 related by subject matter to Published U.S. Application No. 2009/0228245 directed to DNA peak-fitting, yet to be examined; WO 2008/06719 and U.S. Pat. Nos. 7,624,087; 7,640,223; and 7,664,719 directed to an expert system and a related patent application yet to be examined; published U.S. Application Serial No. 2008/0040046, directed to associating an unknown biological specimen to a family, yet to be examined; U.S. Pat. Nos. 6,741,983; 7,272,612; 7,454,411 and unexamined related Published U.S. Patent Application No.'s 2008/0134195; 2008/0172402; 2008/0109461; and Published U.S. Patent Application No. 2009/0055351 awaiting examination directed to a parallel data processing system and a method of indexed storage and retrieval of multidimensional information and organizing data records into clusters or groups of objects. For example, these applications patents may describe by way of example, the clustering of tire combustion products and their composition such as those resulting, from a volcano or other natural event or a man-made fire, human beings having a DNA genetic profile categorized into clusters or groups, machines having a specific manufacturer, plant and animal life indigenous to a particular region of the world, earth and water bodies subjected to adverse weather conditions, buildings of a city versus those more associated with a town or village and the like to predict object properties. A database populated with measured properties of sample objects, not limited to, but, by way of example, electrical or isotopic measurements, and of trace materials found on or in objects or in environmental samples, such as assemblages of micro-bodies including, for example, charcoal or charred particles along with other micro-bodies, together with, for example, geographic data related to the source of the sample objects or environmental samples, as well as their electrical and acoustic properties can be indexed and searched using these technologies to enable the rapid retrieval of information most relevant to an object as broadly defined. The indexing methodology relies upon data reduction methods such as principal component analysis, together with data clustering algorithms, to rapidly isolate potential matches to predict properties of the object, thus producing a selection of reference data that best match the measured properties for the object.

Objects that have been previously collected are analyzed and characterized using, for example, electrical, electronic (radio frequency spectral data), acoustic (audible as well, as ultrasound), chemical, mechanical, optical (visible and invisible spectra), and isotopic measurements of components, and other information about an exemplary object. For example, WO2008/153590 and Published U.S. Patent Application No.'s 2008/0309488 and 2009/0252196 and unexamined U.S. patent application Ser. No. 12/575,320 filed Oct. 7, 2009, to leave et al. describe a passive microwave detection of a speed, fire or intrusion event including black body and spectral emission data, also incorporated by reference in their entirety. Icove et al. have measured passive electromagnetic radiation from a fire event of different types, a human being, an airplane and speed of a vehicle where quiet radio frequencies are suggested for directional, noise-free reception. Such objects, which may also include vegetation, provide distinctive data that may correlate to a signature for a target object either alone or in concert with data from a micro-body database. No active transmission is required from the source to the object or need the passive directional antenna emit any active radiation at any frequency. On the other hand, the sun provides a constant radiation source for reception by a black body during daylight hours. Black bodies are known to radiate different levels of radio frequency across the visible and invisible radio spectrum at different frequencies depending, for example, on temperature, pressure and time and frequency varying characteristics. In particular, for example, the event of a fire and its residual charred remains emit passive and active reflected radiation that can be measured and compared with known spectra data and the properties of the emitting objects predicted. For example, volcanic ash may be differentiated from smoke particle products of a wood fire and those of a chemical fire. Similarly, the event of a fire has been studied as will be discussed further herein and the abundance of microscopic charcoal particles in micro-body assemblages of fire remains or other residue such as condensed metals or oils correlates with type of fire and both regional and local fire occurrence. Directional microphones are also known for the collection of sound waves at sub-audible, audible and ultrasound frequencies. Electrical, electromagnetic and acoustic data provide respective spectral signatures for recognition of diverse objects.

Electromagnetic waves are created when charged particles such as electrons change their speed or direction. These electromagnetic waves consist of an electric field and a magnetic field perpendicular to the electric field. The oscillations of these fields are reflected in the frequency and wavelength of the electromagnetic wave. The frequency is the number of waves (or cycles) per second. The energy of these waves may also be characterized in terms of the energy of photons, massless particles of energy traveling at the speed of light that may be emitted at certain discrete energy levels. The following mathematical relationship demonstrates a relationship among the wavelength of an electromagnetic wave, its frequency, and its energy:

$$\lambda = \frac{c}{f} = \frac{hc}{E}$$

where
$\lambda$=wavelength (meters)
c=speed of light ($3 \times 10^8$ meters per second)
f=frequency (Hertz)
h=Planck's constant ($6.63 \times 10^{-27}$ ergs per second)
E=energy of the electromagnetic wave (ergs)

Wavelength and frequency are the inverse of one another as related by the speed of light, and may be used interchangeably herein in the description of embodiments and the claims as equivalents of one another. Note that the energy of an electromagnetic wave is proportional to the frequency and is inversely proportional to the wavelength. Therefore, the higher the energy of the electromagnetic wave, the higher the frequency, and the shorter the wavelength.

The spectrum of electromagnetic waves is generally divided into regions or spectra, classified as to their wavelength or, inversely, as to their frequency. These hands of wavelengths (frequencies) range from short to long wavelengths (high to low frequency) and generally consist of gamma rays, x-rays, ultraviolet, visible light, infrared, microwave, and radio waves. The term "microwave" generally is used to refer to waves having frequencies between 300 Megahertz (MHz) (wavelength=1 m) and 300 Gigahertz GHz (wavelength=1 mm). Microwave radiation is highly directional, and the higher the frequency, the more directional the emitted radiation. For the purposes of the present application and claims, an emission above 300 GHz up to 1000 GHz will also be considered within the microwave band.

Radiation via electromagnetic waves can be emitted by thermal and non-thermal means, depending upon the effect of the temperature of the object emitting the energy. Non-thermal emission of radiation in general does not depend on the emitting object's temperature. The majority of the research into nor emission concerns the acceleration of charged particles, most commonly electrons, within magnetic fields, a process referred to in the astrophysics field as synchrotron emission. For example, astrophysicists and radio astronomers look for synchrotron emissions from distant stars, supernovas, and molecular clouds.

On the other hand, thermal emission of radiation from electromagnetic waves depends upon the temperature of the object emitting the radiation. Raising the temperature of an object causes atoms and molecules to move and collide at increasing speeds, thus increasing their accelerations. The acceleration of charged particles emits electromagnetic radiation which forms peaks within the wavelength spectrum. There may be a direct correlation in changes in temperature impacting the accelerations of the composite particles of an object with the frequency of the radiation and peaks within the spectrum. Once an object reaches its equilibrium temperature, it re-radiates energy at characteristic spectrum peaks.

Similarly, the acoustic spectrum from sub-audible to ultrasound energy at high frequency, for example, 100 megaHertz, may be detected by similar directional microphones and their data recorded from objects in a database. Electrical characteristics such as impedance and characteristics of an object such as insulation or conduction can be observed and recorded in a database. A combination database of radio frequency, acoustic and/or other spectra (for example, optical) emission data as discussed herein may be referred to herein as an electro-acoustic spectral database or ESD.

Common forms of radiation include black body radiation, free-free emission, and spectral line emission. A black body is a theoretical object that completely absorbs all of the radiation falling upon it and does not reflect any of the radiation. Thus, any radiation coming from a black body is from its inherent radiation and is not the result of any radiation incident upon it. Black body radiation is a basic form of thermal emission of electromagnetic radiation from an object whose temperature is above absolute zero (0 Kelvin). Practical examples of black body radiators include a human body, a Bunsen burner, a candle flame, the sun, vegetation of different types, water bodies, rock formations, man-made structures, machines and other stars in the galaxy.

Passive high-gain directional microwave antennas and receivers have been used to measure the temperature of a remote object in the technical field commonly known as microwave radiometry. Typical users of microwave radiometry are radio astronomers scanning extraterrestrial objects and the earth. A microwave radiometer known from the field of the astronomy sciences pointed at the sky can produce a measurable voltage output which is proportional to the temperature of the target. On the other hand, passive directional radio frequency and acoustic microphones, antennas and receivers pointed toward the earth from an elevated position such as a forest fire tower, a building, an aircraft or a satellite may collect spectral data of all types from objects at which the directional antennas and microphones are pointed and recognized by human observers.

As described above, it is known that fire, including non-flaming fires such as smoldering embers and volcanic rock, emits a wide spectrum of electromagnetic and acoustic radiation. Such radiation includes not only infrared (heat) radiation, but also includes microwave radiation in the range of 300 MHz to 1000 GHz and at corresponding wavelengths of from 1 meter to less than 1 mm, due to the energy radiated by such fires as black body emission and spectral line emission caused by the high energy (temperature) levels of a fire. Such microwave (and acoustic) radiation can be detected without the need for any corresponding emission of microwave radiation by an antenna. Instead, in accordance with aspects and features described herein, the emitted spectral energy of a fire and resultant combustion residuals in the microwave regions of the electromagnetic spectrum and acoustic spectrum can be detected using passive microwave and acoustic detection by one or more passive directional antennae/microphones.

In addition, living bodies such as persons or animals also emit microwave and acoustic radiation due to their inherent thermal energy via black body emission. This radiation and acoustic radiation also can be detected by the same directional antennas and microphones used to detect the microwave radiation and acoustic output from a fire. An electrical/acoustic spectral database (ESD) of persons, animals, objects, plants, structures, vehicles, machines and the like can be produced comprising signature spectral (electrical, electromagnetic and acoustic) and black body emission characteristics.

Each measured property can assist in locating or identifying, for example, the source or predict other properties of the object, for example, if geographically tagged reference data with similar characteristics are available. Trace materials such as charred, for example, charcoal particles in micro-body assemblages (mixtures with other materials and particles) can be used to identify, if not the geographic location or origin, then characteristics of that location such as an expected distribution of plant species, soil types, temperature and humidity conditions, and the nearby presence of geographic features such as water bodies, ancient lake beds, volcanic rock, other rock formations, man-made structures and machines and outcrops of sedimentary rocks. The relative abundance of charcoal in samples and the morphologies of charcoal particles in micro-body assemblages can provide clues about the prevalence of agricultural, household, or other burning, and potentially of fossil fuel combustion by automobiles or industries. As discussed herein, a micro-body assemblage database may be referred to as a MAD database. While a single property of a given object may not provide sufficient discriminatory power, the fusion of information associated with multiple measured properties of multiple objects and micro-body assemblages is more likely to lead to an accurate geographic or other object property prediction or characterization. The above-referenced prior work at the University of Tennessee utilized data obtained from human DNA for clustering. Other prior work at the University of Tennessee utilized content-based image retrieval (CBIR) (Z. Shen, *Database Similarity Search in Metric Spaces: Limitations and Opportunities*, MS Thesis, Electrical Engineering, University of Tennessee. August, 2004) and preferential image segmentation of electronic circuit components for clustering (Y. Pan, *Image Segmentation using PDE, Variational, Morphological and Probabilistic Methods*, PhD Dissertation, Electrical Engineering, University of Tennessee, December, 2007), A resultant image database may be referred to herein as a content-based image retrieval database (CBIR). Also, the University of Tennessee has reported in non-patent literature on automated classification of diatoms and the use of principle component analysis methods for identification of environmental signatures of micro-body assemblages which include pollen.

Data coding methods for a plurality of multi-dimensional databases that are compatible with the present similarity-based indexing and search methodology support an analysis and exploitation of the correlations between micro-body assemblage data and location/feature and other property prediction data. Databases and related modeling software may utilize the proposed methodology including, for example, a plurality of databases comprising electrical/electronic/acoustic data (ESD) and micro-body material assemblage data (MAD) from the literature and CBIR databases maintained for objects of interest as will be discussed herein.

Modeling software and related database technology may lead to an inference of the geographic location and characteristics of points of origin and time/season related data using measurements of object properties and associated trace materials and comparison to reference and historical data. One embodiment comprises a software system that supports collection and modeling activities using a variety of modalities, including electrical, spectral (electromagnetic and acoustic) and isotopic measurements of samples, and analysis of micro-bodies having entrained charcoal particles and other micro-bodies including, for example, diatoms and foraminifera or other micro-bodies, as well as images to identify points of origin and, Possibly, time-varying data, for example, transit routes of objects from a point of origin (for example, associating oil droplets in a body of water or particulate matter in air with the site of an oil spill or leakage or a source of air pollution). In these applications, objects collected from field operations can be analyzed and characterized using, for example, electrical, chemical, acoustic, mechanical and isotopic measurements of components, and information about trace contaminants. Each measured property can help locate or identify the source of the object or predict other object properties if reference data with known or measured characteristics are available. Trace materials, such as micro-body assemblages including charcoal particles and other micro-bodies including pollen, diatoms, and foraminifera, can be used to identify, if not a point of origin or transit, then characteristics of that location such as an expected distribution of plant species, soil types, temperature and humidity conditions, and the nearby presence of water bodies, ancient lake beds, and outcrops of sedimentary rocks. As explained above, the relative abundance of charcoal in micro-body assemblage samples and the morphologies of charcoal particles can provide clues about the prevalence of agricultural, household, or other burning, and potentially of fossil fuel combustion by automobiles or industries. While a single property may not provide sufficient discriminatory power, the fusion of information associated with multiple measured properties is more likely to lead to an accurate object characterization and prediction of other object properties that may further include date and time data.

Similarity-based search technologies are incorporated into database and modeling software embodiments that support model-based inference of properties of objects from a database of information gathered from previously analyzed objects and samples. An anticipated structure of this software is provided in the subsection title "Detailed Discussion of Embodiments." The software may operate as an overlay to a Commercial off-the-Shelf (COTS) database product that supports SQL queries across a standard network interface. The MySQL database software from Oracle may be utilized for this purpose; (refer to http://www.mvsql.org/ for further information).

Electrical, electromagnetic and acoustic measurements, specifically time- and frequency-series data, exist in the published literature for certain objects such as previous fire events and residual objects. Multivariate statistical analysis, based upon principal component analysis (PCA) methods, can be used to extract the data most relevant to localization from the raw measurement data. Analysis of spectra using PCA for identification of chemical compounds and inference of origin has been very successfully employed in the field of analytical and food chemistry. The extracted content can be utilized to organize a database of information about objects in a manner that supports nearest neighbor search strategies based upon measures of similarities between objects. The methods are highly efficient because of the in-memory database index. The enabling information technologies for this approach are described, for example, in U.S. Pat. Nos. 6,741,983, 7,272,612, and 7,454,411 incorporated by reference herein as to their entire contents for all purposes. An overview of one of the technologies is provided below in the subsection titled "Multivariate Statistical Analysis and Data Clustering". Another method indexes information using partitions determined by entropy and adjacency measurements or functions. These patented methods have been used to construct several different types of databases that implement similarity-based search strategies, including databases of human DNA profiles used for forensic identification and have also been applied, as will be described below for content-based image retrieval (CBIR) databases. As will be discussed herein, by way of example, databases of data of different types for a given object may contain previously collected and stored data of each type in an image database, a micro-body assemblage database and an acoustic and electromagnetic spectral database. Other databases having data of different types may be, by way of example, one of time series and frequency series data, for example, the maintenance, repair, component wear and failure record for a machine, vehicle or process, for example, pipe, pump or valve failure or wear or electrical system failure such as power (battery).

Trace particle assemblages in sediment and soil samples are used by forensic scientists to infer the geographic and environmental characteristics of samples from crime investigations. For example, micro-body assemblages in a soil sample on a shovel, for example, containing charcoal, pollen and the like can provide information on existent vegetation and vegetation fire residuals that may help pinpoint a grave site. This forensic work is discussed, for example, in D. A. Korejwo, J. B. Webb, D. A. Willard, and T. P. Sheehan. "Pollen analysis: An underutilized discipline in the U.S. forensic science community," presented at the Trace Evidence Symposium sponsored by the National Institute of Justice and held Aug. 13-16, 2007 in Clearwater Beach Fla. Micro-body assemblages including especially charcoal particles or pollen and, for example, foraminifera, and other microfossils can similarly help to establish the origin or travel route of a suspect or object involved in a crime. Such micro-body assemblages are also studied to understand past climate and environmental change, and in the case of pollen, in research on human allergens, crop pollination, and honey production. The use of microfossils in these various applications has produced literature on microfossil types and related micro-body assemblages that can be used to help develop properties of objects of interest. Of particular importance are studies of modern pollen and diatom distributions carried out to help calibrate records of past environmental change obtained by studying stratigraphic sequences of microfossil assemblages preserved in modern and ancient lake and marine basins; see, for example, L. M. Kennedy, S. P. Horn, and K. H. Orvis, "Modern pollen spectra from the highlands of the Cordillera Central, Dominican Republic," *Review of Palaeobotany and Palynology* 137 (2005) 51-68; K. A. Haberyan, S. P. Horn, and B. F. Cumming, "Diatom assemblages from Costa Rican lakes: An initial ecological assessment," *Journal of Paleolimnology* 17 (1997) 263-274, and C. Shen, K.-B. Liu, L. Tang, and J. T. Overpeck, "Numerical analysis of modern and fossil pollen data from the Tibetan Plateau," *Annals of the Association of American Geographers* 98 (2008) 755-772. These so-called "modern calibration studies" have the goal of relating modern micro-body assemblage data to patterns of climate, vegetation, and other environmental variables—in which we use the relationships between modern micro-body assemblages and environmental and geographical factors to predict properties of objects of interest.

Modern micro-body assemblages are usually expressed as percentages of particles, for example, charcoal particles, classified by taxonomy or (when taxonomy cannot be resolved) by morphology: see, for example, M. D. Enache and a F. Cumming, "Tracking recorded fires using charcoal morphology from the sedimentary sequence of Prosser Lake, British Columbia (Canada)," *Quaternary Research* 65 (2006) 282-292. The micro-body assemblage data can be treated as vectors and can be readily processed using the similarity-based information retrieval and modeling technologies discussed herein.

Source data on modern micro-body assemblages are available in the published literature, in unpublished documents such as student theses, and in a few databases developed for paleoclimate research. Information on these trace contaminants in modern sediments and soils and in paleolakes (ancient lakes now dry) of the study region, which are a source of airborne micro-bodies (such as volcanic ash) is obtainable from published literature and from field study. Although the utility of these trace contaminants for source and property attribution has been established, research efforts aimed at formalizing the automated use of information on modern micro-body assemblages and their environmental controls are provided according to one embodiment. Automated identification methods for, for example, micro-body assemblages comprising pollen grains and prior pollen studies in a given region may comprise portions of a database for pollen, a similar database provided for charcoal particles and a similar database for each type of micro-body assemblage of interest.

Micro-body assemblage data (MAD) collection may comprise another database collection and its coding. Geographical locations (coordinates) and environmental characteristics of samples, including climate factors, vegetation, presence of wetlands, soil types, land use, and other factors and properties may be included in the database. Again, available literature and other data sources potentially include high resolution aircraft imagery, forest fire tower, traffic monitoring, building security and satellite and related spectra and other data collection. Because micro-bodies such as volcanic ash, smoke particles and pollen can be transported long distances by wind, micro-body assemblages may be determined, for example, by the matrix of vegetation and natural structure types over fairly broad areas. Diatom assemblages may likewise be influenced by paleolakes upwind from the sampling site. To tie micro-body samples and objects to geographic and environmental conditions suggests populating related assemblage databases with information on a regional context as well as local characteristics of a particular sampling site.

A reference core database may preserve both assemblage information and citations to the sources, and when it is available, linkage to supporting imagery for later comparison to target samples using content-based image resolution CBIR. Assembly of a sufficiently large reference database for accurate estimation of geographic characteristics and location is likely to require a program of environmental sampling to supplement data available in the literature and world-wide databases. Such a program may include samples from various world regions and eventually require automated sample analysis. An automated particle analysis system may require computer-aided image analysis and interpretation, acquired using either optical or electron microscopy or other imaging techniques not limited to X-ray and magnetic resonance imaging. Some work has been done on the automated classification of trace micro-body particles using image analysis. Automated systems are limited to use in a few laboratories engaged in research on automation; see, for example, J. Bollman et al., "Automated particle analysis: calcareous microfossils," in *Image Analysis, Sediments and Paleoenvironments*, P. Francus (ed.), Kluwer (2004) 229-252 and I. France, A. W. G. Duller, and G. A. T. Duller. "Software aspects of automated recognition of particles; the example of pollen," in *Image Analysis, Sediments and Paleoenvironments*, P. Francus (ed.), Kluwer (2004) 253-272. Automated identification approaches typically rely upon artificial neural networks, which require extensive tuning using training sets and do not readily extend to accommodate new information.

European researchers have reported some success for identification of micro-body assemblages including diatoms. Identification of micro-body assemblages depends upon 3D characteristics that are inferable by manipulation of particles within a sample to obtain images of individual grains in various orientations, and rates of correct identification tend to be in the mid-80% range; see, for example, C. Chen et al. "Feasibility study on automated recognition of allergenic pollen: grass, birch and mugwort," *Aerobiologia* 22 (2006) 275-284. Microscopy techniques such as refocusing to move the focal plane through the grain and acquiring a sequence of images can be useful, and the issues are less severe with scanning electron microscopy (SEM) and, possibly, with confocal image acquisition techniques; see, for example, U. Seppä and K. D. Bennett, "Quaternary pollen analysis: recent progress in palaeoecology and palaeoclimatology," *Progress in Physical Geography* 27, 4 (2003) 548-579. Partial and overlapping images of particles are also prevalent, and obscure features that are needed for identification. A human operator can reorient and separate particles during observation (currently not feasible in automated microscopy systems but likely within the near future). An evolving technology for image processing and object recognition, preferential image segmentation, can be used to isolate features of interest from image data, such as pollen and diatoms, for use in queries to an image database. This technology is described in Y. Pan, J. D. Birdwell and S. M. Djouadi, "Preferential image segmentation using trees of shapes," *IEEE Trans. Image Processing*, 18 (2009), 854-866, and may be an initial processing step for images of pollen and diatoms, prior to multivariate statistical analysis and storage or search in a database. Other known methods of image enhancement, registration, segmentation and feature extraction are available in the published literature and can also be used.

Measured properties of objects and entrained materials can be utilized, in conjunction with a database that supports search and retrieval based upon similarities among objects, to provide information about points of origin and time varying data about the object and to predict further properties. A body of information exists in the literature on the geographic distributions of some micro-bodies including microfossils, particularly pollen grains and diatoms, and on the environmental characteristics of sample collection sites.

Trace analysis of pollen samples in forensic botany relies upon the correlations between micro-body assemblages, or the distribution of pollen grains across plant taxa, and source location and environmental characteristics. The assemblage is simply a vector of percentages of grains from each taxon found in a sample and is determined by manual analysis in a laboratory. Micro-body assemblage data for pollen and other microfossils may be utilized along with raw data such as images obtained by optical or electron microscopy. Identification of micro-bodies including charcoal particles and microfossils may be automated using a combination of Content-Based Image Retrieval (CBIR) and a reference database of typed images, with a transition to candidate automated identification system(s).

CBIR is a relatively new technology that has undergone rapid evolution over the past decade. An early application is discussed by A. Oakly; see A. Oakly, "A Database Management System for Vision Applications," *Proceedings of the Conference on British Machine Vision*, vol 2, 629-639 (1994), using Manchester Visual Query Language to distinguish two microfossils using a projected circular Hough transform in a microfossil image. The effectiveness of CBIR is dependent upon the range of image content that must be searched. For example, human facial recognition systems tend to exhibit reasonably good performance with adequate lighting and standardized profiles and image geometries (for example, the full facial views with flat lighting that are typical of drivers licenses and ID cards). In contrast, a facial recognition system that uses actively controlled cameras in an outdoor environment to acquire data from uncontrolled subjects tends to have a poorer performance.

As will be explained herein, CBIR in one embodiment is based on prior work on preferential, or model-based, image segmentation, and can be used to focus upon those portions of an image (for example, apertures and sculpturing on pollen grains) most likely to lead to accurate identification, and the use of similarity-based search strategies to determine reference objects with similar features. A successful system may identify and focus upon micro-bodies including charcoal particles and microfossils including pollen grains (or diatoms), identify each grain, and determine the frequencies of occurrence of each type. These data can then be used in a search for similar micro-body assemblages within a micro-body assemblage database (which as described above may comprise a plurality of databases, one for each micro-body), to provide data relevant to a source or other properties of an object of interest such as a smoke particle, man-made fire remnant or volcanic ash. Development of a large-scale trace analysis capability based upon entrained grains in objects, for example, including charcoal, requires acquisition and coding of additional reference data from the published literature. An automated micro-body assemblage identification system as described herein can substantially reduce the manpower requirements for reference data acquisition and allow better coverage of geographic regions of interest.

Electrical, electromagnetic and acoustic properties of object components are expected to be indicative of object properties and may provide an object signature. A database is known for emission of black body radiation from known objects, and this database may be utilized as one example of a property of an object. Acoustic or noise emission is another example of a property exhibiting a spectrum which may be related to further properties such as pressure, temperature, object type, such as a type of human body, machine or vehicle, and vary over time. These measurements comprise, but are not limited to, spectral data and have been shown to correlate to an object such as a human being, a structure or a fire event or its residuals as discussed above. Multivariate statistical analysis, based upon principal component analysis (PCA) or partial least-squares (PLS) methods, can be used to extract the data most relevant to localization from the raw measurement data.

The extracted content can be utilized to organize a database of information about properties of objects and to predict further properties in a manner that supports nearest neighbor search strategies based upon measures of similarities between objects. Information about similar reference objects from the database can then be utilized to estimate or predict properties of an object and the object itself. New objects can be treated as new information and incorporated, with appropriate review, into the forensic database, to be used to link to and identify future objects with similar properties. This allows the reference data collection to grow as analyses are performed and maintain currency. The database search and retrieval methods are highly efficient because of the in-memory database index. The database may include metadata, such as information about date and time, and source data such as manufacturer and/or vendor, or location of an object when this information is available. A database search and retrieval operation provides access to the metadata of objects similar to an unknown target object, which provides inferences about the point of origin for each new object analyzed and searched. By similarity, as used in the application, is intended, by way of example, the probability or likelihood that two objects are related by at least one property.

Multivariate statistical analysis presumes that one or more portions of the measured characteristics or properties of an object can be expressed as a vector, or ordered sequence, of numbers (of which a large number may be required). Values indexed by time (time series) or frequency (spectra) are two examples of such data. A measured concentration or intensity as a function of position, time or another independent variable, for example, as is used in chromatography or electrophoresis, is another example. While such an ordering may not be appropriate for all measurements of a sample (for example, images, time- or frequency-series, and genetic sequence data are not always encoded in a single vector), it is usually possible and preferable to represent one type of measurement as a vector, where several measurement vectors (of different types) may be associated with each object. Methods such as principal component analysis and clustering algorithms (for example, k-means) can be applied to each type of vector, and the methods described by the above-referenced patents incorporated by reference can be used to create databases (indexed collections of measurement data) for each vector type.

A single measurement vector, for example, an electrical spectrum, may not by itself be especially informative of an object's identity, physical and electro-acoustic properties, or location or time varying activity. However, the measurement can narrow down the set of possible origins or other properties, typically by excluding those reference objects that have substantially different spectra, and other measurement types can be used to refine the inferred source or property. As an example, stable isotope ratios, determined using a mass spectrometer, can be used to associate objects with a particular location, and are utilized in forensic science; see, for example, S. Benson, C. Lennard, P. Maynard, and C. Roux. "Forensic applications of isotope ratio mass spectrometry—a review," *Forensic Science international* 157 (2006) 1-22. Entrained pollen and diatoms can also be used for inference of geographic location (or expected characteristics of the location); see, for example. L. A. Milne, V. M. Bryant Jr., and D. C. Mildenhall, "Forensic palynology," in Forensic Botany: Principles and Applications to Criminal Casework. H. M. Coyle (ed.), 217-252. CRC Press, Boca Raton, Fla. 2005 and M. Leira and S. Sabater, "Diatom assemblages distribution in catalan rivers, NE Spain, in relation to chemical and physiographical factors," Water Research 39 (2005) 73-82.

Most chemical elements occur in the environment as a mixture of isotopes. Stable isotope ratios of Hydrogen, Carbon, Nitrogen, Oxygen, and Sulphur are commonly analyzed in forensic science; see, for example, S. Benson et al., "Forensic Applications of Isotope Ratio Mass Spectrometery—a Review," *Forensic Science International* 157 (2006) 1-22. Isotope ratios are reported relative to the light isotope as delta values relative to a standard, which are the deviation, in percent, from the standard. A vector of agreed-upon isotope ratios can be utilized to construct an index of stored reference objects and naturally fits within the framework of an embodiment of database technologies as described herein, for example, by creating an index for each isotope ratio. Thresholds can be utilized to exclude reference objects from search results if their recorded results are significantly different from the tested sample's values or accept (meaning one cannot exclude the reference object based upon its isotope ratio), or leave undetermined if no isotope ratio is available. The results can be combined by returning only those reference objects that cannot be excluded using at least one isotope ratio, and that are not excluded using any isotope ratio for further analysis.

The use of stable isotope ratios, in addition to the spectral data, points to combining search results across multiple indices. This provides input to the design of an information storage platform: Objects should be indexed using multiple and disparate characteristics, such as electrical spectra and stable isotope ratios, and search results should utilize all of the available indexed data which may be all of ESD, MAD and CBIR among other data. According to an aspect of an embodiment, first, multivariate statistical analysis and clustering are utilized to extract information that is most relevant to the object from raw data sources, which may assist in determining location or time varying activity with respect to an object. Second, search and retrieval operations are based upon the similarities between objects, and not an exact match to a value in a stored record's field, or inclusion of that value in a specified range. Third, models can be applied to the metadata, or properties, associated with reference objects to predict properties of interest for a target sample.

The models may be single- or multivariate and may be utilized to interpolate the value of value set of a property of an object of interest for values for the same property of similar objects retrieved from the databases. In this case, the property may be, provided by way of example only a location or source of manufacture or distribution, a type of material consumed in a fire or used to accelerate or extinguish a fire, the classification of a micro-body or smaller microscopic particle, the type or class of a vehicle, the type or state of a weapon or other device carried within luggage, or the state or status of equipment or a process in an industrial setting such as an electric utility or chemical plant. The models may also be statistical, or Bayesian, such as a Bayesian network or belief network that relates a set of objects retrieved from the database with an object of interest. This is but one set of exemplary models that are graphs or directed graphs, as are well known in the field of computer science which can also be used. In this case, the predicted property may be, for example, the likelihood, probability, or belief that the target object and the retrieved objects satisfy a postulated relationship, or a set of likelihoods, probabilities, or beliefs determined across alternative hypotheses. If only two hypotheses are postulated, this set of likelihoods may be expressed as a likelihood ratio. Examples include the identities, command structure, or purposes of individuals, devices, software components, or other entities such as businesses that communicate via a network, genetic relationships among individuals and, optionally, phenotypes such as the susceptibility to or ability to cause or prevent disease, whether among plants, animals, or single-celled organisms, and the detection of individuals or other entities engaged in an illicit enterprise. The embodiment further may include image information, which is necessary for identification of pollen, diatoms, and other trace microfossils that may be found on objects including, for example, vehicles and individuals.

The models may incorporate optimization. One example is the utilization of optimization such as least squares or maximum likelihood optimization methods that are well-known in the art to determine a model that best fits the values of one or more properties of objects that result from a database search. This optimized model can then be used to predict at least one property of a target object. A more complex example is the use of a database of time series data or data indexed by frequency, such as spectra, obtained from measurements made on a physical process such as a chemical reactor or gas turbine. In order to determine or localize a worn or failed component in the process one may record measured data in a database that supports similarity-based or nearest neighbor search at various times during the operation of the process. These recorded data form a historical record of the operation of the process, and recorded measurement data from a current operating period can be utilized as a target in a search of the historical data. Results returned from a search have similar characteristics to data from the current operating period and can be used to model or predict the status, such as wear or failure mode, of a component in the process, or to model or predict the future behavior of the measured process. For example, similar time series data from the historical record can be utilized to develop an impulse response model of the process in order to predict future process state as a function of time and/or future measurement values. In this case, the impulse response model can be obtained by solving a quadratic programming optimization or convex optimization problem. Other methods such as dynamic matrix control, quadratic dynamic matrix control, model predictive control, and optimization of linear matrix inequalities can be utilized. See, for example, S. P. Boyd et al., "A new CAD method and associated architectures for linear controllers." *IEEE Transactions on Automatic Control*, 33 (1988) 268-283, C. E. Garcia and A. M. Morshedi, "Quadratic programming solution of dynamic matrix control (QDMC), *Chemical Engineering Communications*, 46 (1986) 73-87, S. Boyd et al., *Linear Matrix Inequalities in System and Control Theory*, Society for Industrial Mathematics (1997) ISBN 978-0898714852, and M. Morari and J. H. Lee, "Model predictive control: past, present and future," *Computers and Chemical Engineering* 23 (1999) 667-682. Approximations to the optimal solution can also be utilized. See, for example, S. Wei et al., "Applications of numerical optimal control to nonlinear hybrid systems," *Nonlinear Analysis: Hybrid Systems* 1 (2007) 264-279, and B. Moerdyk et al. (including inventor J. Douglas Birdwell), "Hybrid optimal control for load balancing in a cluster of computer nodes," *Proc. of the 2006 IEEE Int. Conf. on Control Applications* (2006) 1713-1718. Switching strategies may be embedded in a constrained continuous space representing the fractions of loads to be transferred between each pair of computational elements; see, for example, Bengea et al, "Optimal Control of Switching Systems," *Automatica* 41, 11-27 (2005) and Bengea et al., "Optimal and Suboptimal Control of Switching Systems, *Proceedings of the $42^{nd}$ IEEE Conference on Decision and Control*, 5295-5300 (2003). A compartmental model can be utilized, where parameter identification is performed using well-known methods in the art to fit model parameters to measurement data; see M. H. Plawecki et al., "Improved transformation of morphometric measurements for a priori parameter estimation in a physiologically-based pharmacokinetic model of ethanol," *Biomed Signal Process Control* 2 (2007) 97-110. The database would be queried to determine the measurement data from the historical record that are most similar to current conditions, determined by measurement, such historical measurement data utilized for parameter identification. In these cases, the predicted or inferred characteristics of a target object are utilized to subsequently control a physical process.

Materials exposed to a local environment may entrain small airborne particles, among which are pollens charcoal particles, and, tier areas near current or ancient lakes or seas, diatoms and foraminifera. Of these particle types, pollen is most commonly used in forensic applications. Diatoms have been shown to be effective markers for the origin of objects; see, for example, M. Leira et al., "Diatom Assemblages Distribution in Catalan Rivers, NE Spain, in Relation to Chemical and Physiographical Factors," *Water Research* 3 (2005) 73-829. If diatoms are aligned flat, i.e. with the polar axis parallel or possibly at right angles to the image plane, symmetry is helpful, more so than for pollen grains: see, for example, S. Fischer, "Symmetry Based indexing of Diatoms in an Image Database, icpr, vol. 2, $15^{th}$ International Conference on Pattern Recognition, (2000), 895-898. See also E. Joynt et al., "An Image Database for Diatom Identification and Nomenclature—Focus on Metadata." *Journal of Paleolimnology* 22, 109-114 (1999) for a discussion of a relational database for communication of taxanomic and ecological information including an image table, a nomenclature table (DIATCODE), a collections table, a count table and a methods table. A common use of diatoms in forensics is determining circumstances of drowning. Micro-body assemblages including charcoal particle and other micro-bodies such as pollen in the assemblages are less often considered in forensic applications. However, studies of modern microfossil distributions carried out by paleoenvironmental scientists to calibrate records of long-term change have shown that all of these particle types, charcoal, pollen, diatom, etc. show geographical patterns and environmental relationships that make them potentially useful for sourcing objects in forensic applications. Airborne dust in arid regions may contain diatoms and foraminifera from the surface sediments of dry lakes that can potentially help to source the dust, given databases being available on the micro-body assemblages in dry lakes of the region. Marine diatoms may also be found in dust of arid regions. In dry environments, diatoms, foraminifera, and charcoal particles may be more resistant than pollen grains to destruction through oxidation, giving them special importance for sourcing objects in some regions of the world.

For all four types of particles, the characterization of a sample is by the assemblage of micro-bodies including microfossils present, which can help to "fingerprint" a source region and thus predict other properties. For pollen, L. A. Milne et al., "Forensic Palynology," *Forensic Botony: Principles and Applications to Criminal Casework*, 2005, 217-252, CRC Press, recommend identification of 200 to 1000 pollen grains to obtain an adequate characterization. Identification is based upon the physical characteristics of pollen grains, including grain size, shape, and positioning of apertures (openings in the surface through which the genetic material is transferred), sculpturing (ornamentation or patterns on the surface), wall composition and preservation (which depends upon the environment at the collection site), and wall structure. The physical characteristics are observed after chemical and physical processing to remove other materials, and can utilize either optical or electron microscopy. The micro-body assemblage data is characterized by the frequency of occurrence of each type of particle or grain in the sample and can therefore be represented as a vector. If the vector is considered to represent the frequency of occurrence of each grain species represented in a reference database, it is sparse, since a relatively small number of species (compared to the content of the database) are likely to be present in each sample. In some cases, the presence of a unique pollen type in a sample may provide a locational fingerprint, if that particular pollen is produced by a plant species with a very narrow distribution. Similarly, it is known that passive directional spectral data collection may distinguish one form of vegetation from another in an ESI) database.

At present, grain identification relies upon features visible through a microscope or in images of grains and human expertise to correlate those features with grain type and taxonomy. Some digital repositories or identification keys exist, for example the Newcastle Pollen Collection and the key to pollen of the Bahamas (www.pollen.mtu.edu). The quality of images, and the extent to which these resources can be used for identification, also varies. Most pollen analysts use these digital resources, or printed volumes of pollen illustrations that predate digital efforts, only as guides to identification, supplemented by physical collections of reference pollen slides that analysts develop by sampling herbarium specimens of plants of their study areas, and processing them chemically to prepare slides that are similar to slides prepared from environmental and forensic samples. However, as image quality in digital collections improve, and as microscopy itself comes to rely more on image analysis, image databases will become more widely used in pollen identification as well as in the identification of other microfossils. In the European community for automatic identification and classification of diatoms, a project known as ADIAC reports identification rates of 80-90%.

A micro-body assemblage may further comprise a heavy metal. A. Facchinelli et al. have studied the regional variability in northern Italy of heavy metals in soil samples, for example, chromium, cobalt, nickel, copper, lead and zinc using MVS and GIS-base approaches; see A. Facchinelli et al., "Multivariate Statistical and GIS-based Approach to Identify Heavy Metal Sources in Soils," *Environmental Pollution*, 114, 313-324 (2001). Measures of chemicals and contaminants in dust and surface soil may provide a fingerprint to link samples to types of places to an actual location such as northern Italy or to other samples.

The design of a grain database may employ Content-Based Image Retrieval (CBIR) using measures of similarity between segments of images. These segments can be grains, or features on the surface of grains (sculpture and apertures). One advantage of retrieval based upon similarity measures is the potential to correctly identify degraded grains, or grains from images that are partially obscured by other grains or artifacts. Prior work includes the extension of CBIR to preferential image segmentation and identification using content models based upon trees of shapes; see, for example, Z. Shen, *Database Similarity Search in Metric Spaces: Limitations and Opportunities*, MS Thesis, Electrical Engineering, University of Tennessee, August, 2004 and Y. Pan, *Image Segmentation using PDE, Variational, Morphological and Probabilistic Methods*, PhD Dissertation, Electrical Engineering, University of Tennessee, December, 2007. Metadata associated with stored images of grains can include the location and date of collection, as well as other descriptive data. Similar database and identification and characterization approaches can be utilized for pollen, diatoms, and foraminifera, Studies of microscopic charcoal particles as indicators of fire regimes have focused on total particle abundance per volume or weight of sediment, or in comparison to pollen abundance based on visual quantification of particles on slides prepared for pollen analysis; see, for example, K. Anchukaitis and S. P. Horn, "A 2000-year reconstruction of forest disturbance from southern Pacific Costa Rica. Palaeogeography, Palaeoclimatology, Palaeoecology 221 (2005)35-54 and L. M. Kennedy, S. P. Horn, and K. H. Orvis, "A 4000-yr record of fire and forest history from Valle de Bao, Cordillera Central. Dominican Republic," Palaeogeography, Palaeoecology, Palaeoclimatology 231 (1996) 279-290. The feasibility of automatic quantification has been demonstrated; see, also, L. M. Kennedy, S. P. Horn, and K. H. Orvis, "A 4000-yr record of fire and forest history from Valle de Bao, Cordillera Central, Dominican Republic," Palaeogeography, Palaeoecology, Palaeoclimatology 231 (1996) 279-290. Newer approaches have focused on particular charcoal morphologies that can indicate the type of material burned, which may provided, more detailed environmental clues. Both approaches to charcoal quantification may be accommodated in an embodiment of the present database.

The application of the present embodiment is not limited to fire detection, forensics, fire residual determination and the like. Other applications include financial, data mining, criminal activity pattern detection and disease modeling or disease discovery.

For example, with respect to a financial application, time series can be stock or other equity prices, and the correlations between time series can be used as a measure of similarity (for example, $R^2$) in statistics. One would look for exploitable patterns—equities that move as a group, or that may have correlation delayed in time with respect to another. PCA can be used to cluster similar time series, corresponding to equities that behave similarly. The model can be a method of portfolio analysis—in other words, an optimal allocation strategy to determine the best allocation of investments. See also data mining, below.

With respect to data mining, the method can be used to mine information in a database—looking for clusters of similar behaviors. This can be purchasing patterns of consumers, or of businesses (e.g., raw materials). A model can be applied to some or all of the members of a cluster (similar objects) to determine their relationship. The model can be a Bayesian or belief network, or a pedigree, which is a graph of hypothetical relationships between objects. Relationships can be flows of capital or goods/services between members of a cluster (or a subset of a cluster). Multiple hypothesis testing or maximum likelihood estimation can be used to determine which relationships (models) are more (or which is most) likely. Similarity-based search can determine objects in a database that are most similar to a target, or objects most similar to each other. By exploiting the high speed of the database, one can perform a search of the database against itself to determine a list of the most similar clusters or subsets of objects and apply models to these to test hypotheses. The results of this procedure can be used to add information to the database, which could be "metadata", or data about the data (clusters), mining the database for knowledge.

With respect to detection of patterns in criminal activity, behaviors (objects in the database) may be suspicious transactions that are observed or reported. Hypotheses may be the possible organizational structures of a criminal network or conspiracy. Similarity based searches may be used to detect patterns of criminal or fraudulent activity. This could also be interactions among computers or communications devices such as nodes in a communications network, where the goal is detection of organized behaviors. Transactions could also be medical records or medical data such as medical claims for reimbursement from insurance or Medicare, where the goal is detection of patterns of activity indicative of consumer fraud.

With respect to disease modeling or drug discovery, attributes can be measurable quantities about objects, such as individuals, and properties that are inferred by the models and can be an expression of characteristics of the objects, such as disease or drug resistance. This relates to the classic application of Elston and Stewart (R. C. Elston and J. Stewart, *A General Model for the Genetic Analysis of Pedigree Data, Human Heredity* 21 (1971), 523-542) and models derived from their approach with genotypes and phenotypes.

BRIEF DESCRIPTION OF THE DRAWINGS

One embodiment of a method and apparatus for predicting object properties will be discussed in the context of the following drawings wherein:

FIG. 15 shows partition of a 2-level indexing tree wherein FIG. 15B shows a final partition.

DETAILED DESCRIPTION OF PREFERRED EMBODIMENTS

Figure 1:
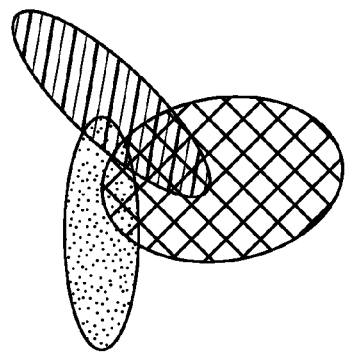
FIG. 1 is a Venn diagram showing selected reference data from three similarity searches and their juncture or overlapping region.

Embodiments of a method and apparatus for predicting object properties using similarity-based information retrieval and modeling will be described with reference to FIGS. 1-21. One embodiment promotes the use of a federation of database indices, for example, those corresponding to electrical spectra, isotopic ratios, pollen, charcoal, diatoms, and foraminifera, all of which previously stored data can be searched using similarity-based methods for reference samples with characteristics similar to those characteristics or of a type of data measured and stored for an object. Each database index may be implemented by a search engine, utilizing a common commercial off-the-shelf database or a file system as a persistent storage repository. A search management process may be utilized to coordinate requests from clients for information across all database indices, and for interpretation of the search results to present a coordinated response to each user. Referring to FIG. 1, there is illustrated a Venn diagram of the selected reference data from three similarity searches. The combination and utilization of information from searches involving multiple attributes of the newly acquired target object of interest can, reline the estimate of properties related to the object's geographic origin or other property, as illustrated by the central intersection of the three depicted similarity searches shown as ellipses in FIG. 1. Similarity measures can be used to cluster by similarity and then apply model(s) to clusters to test hypothetical relationships—with or without a target object or object of interest. The object of interest may be a member of the database. For example, one may perform searches for similar objects contained in the database for all members of the database. See, for example, the third method, of U.S. Published Patent Application No. US 2008-0040046 of Feb. 11, 2008, for a method to detect and identify relationships among family members in a mass disaster setting. Of course, the embodiment of FIG. 1 is merely illustrative and the figure is not limited to three but may involve hundreds or thousands of similarity searches. A database can be dynamic, with new information being added to the database, which data can change the membership of clusters and the validity of hypotheses.

Reference data that are tagged with properties such as the circumstances of manufacture or distribution and points of origin can be utilized to infer point of origin information for a newly acquired target object. Deterministic or static models may be utilized to infer these properties and predict other properties. Example models include methods known in the art of curve fitting and interpolation, least-squares models, and principal component analysis (PCA). Maximum likelihood estimation methods (e.g., likelihood ratios) may also be utilized to provide a quantitative statistical assessment of the relative support for competing hypotheses. Likelihood ratio analysis may require investment in the development of a reference data set because such methods are Bayesian—they rely upon a priori statistical information about the probability that samples with specific characteristics will be found at the stated locations (or with these characteristics). Other approaches such as artificial neural networks, belief networks and fuzzy logic may be used to advantage. Dynamic machine learning methods such as reinforcement learning can be used to update behaviors of the models based upon newly acquired knowledge.

Existing technologies that enable the development of database and modeling capabilities to support source identification from trace microfossil and electrical analyses are utilized in existing systems for the dynamic indexing and storage of updated data, for example, related to human identification. The technologies are utilized in one embodiment to implement a more general type of database (the Core Database) that supports utilization of correlations between observed attributes and properties of reference objects to model and predict the site properties and contexts of newly acquired objects of interest.

One embodiment of a database is an Electrical/Acoustic Spectra Database (ESD) that supports the comparison of objects of interest to a reference collection based upon measured spectral characteristics and inference of properties and contexts of one or more target objects from data associated with similar reference objects. As described above, such a database may comprise black body and spectral emission at acoustic and electromagnetic radio frequencies (where "acoustic" may comprise audible, sub-audible and ultrasound spectral emission of objects. Data may be collected from reference objects at all frequencies and over time and at varying temperature and atmospheric pressure.

A second embodiment of a database is a Micro-Object Assemblages Database (MAD). MAD supports comparison of micro-object data derived from expert study of objects of interest to stored reference micro-body assemblages, and inference of properties and contexts of one or more target objects from physical, geographic and/or environmental data associated with similar reference assemblages. Both databases are merely exemplary of other databases that may be employed to advantage such as a content-based image retrieval database (CBIR) database as will be described further herein. The databases will support storage of data objects containing identifying features (spectra for the ESD, assemblages for the MAD and images for CBIR), source information (such as when/where/from what a specimen was collected), and information on site properties and context that can be used to infer geographic location and/or time-based activity. Multiple ESD. MAD and CBIR databases may be implemented using the Core Database technology to form a plurality of hierarchical and relational databases to improve the accuracy of the inferred properties of target objects and their probability of occurrence.

For example, domestic farming activities may benefit from an ESD database as described above. Since the technique is also sensitive to body temperatures within the field of view of the receiving antennae, the tracking and corralling of livestock such as cattle over ranges, entering corrals, and even wandering outside boundaries could be beneficial, particularly for those in the milking industry. This technology could also determine thermal signatures of livestock, humans, or predators so that such animals can be monitored and undesired intruders identified. Thermal signatures of plants and vegetation may signal a problem of oncoming drought or plant disease.

Microwave speed, fire and intrusion detection capabilities can also be used to detect the movement of vehicles along roads and tunnels and shipboard and airplane movements along channels. Signature analysis could identify the traffic flow and thermal signatures differentiating between cars, trucks, motorcycles, planes, trains, boats and other vehicles or vessels. This technique could also identify stalled vehicles or those catching fire, particularly in high density underground tunnels.

The ESD and the MAD and other related databases may have a client-server architecture, as described in the subsection titled "Design Overview", so both client and server software may be utilized. An example of information on site properties and context is the geographic location, date, and time of collection. However, the information may be descriptive, especially when reference materials are extracted from the literature; examples include local and regional vegetation, and the proximity to paleolakes. This information may exist in the primary literature, but it also may have been obtained from other sources. Data coding can be designed to provide information in a form that can be utilized to infer the characteristics of the source of a newly acquired sample. It is anticipated that a significant portion of the client and server software will be common to both (or several) database applications. The initial databases and related software provide a base platform for other database applications in the future, including support for micro-body including charcoal particle and microfossil recognition. The database server and associated data processing methods may be implemented, for example, using the C++ or a similar programming language, and a client device may be implemented using Java, C# or other programming language suitable for implementation of a user interface or client program.

Tagging in the ESD and MAD databases may uniquely identify the objects and selected properties. Multivariate statistical analysis and clustering will play a key role in identifying nearest neighbors and clustering. Matlab may be utilized to provide a rapid prototyping capability to assess design and data analysis alternatives. Clustering opportunities may determine an efficient indexing and search method to be used for the database. One approach is illustrated below, by way of example, using DNA profile data in the subsection titled "Multivariate Statistical Analysis and Clustering" (MVS), Electrical and acoustic spectral data are, at a fundamental level, vectors that can be processed and aggregated using methods based upon principal component analysis (PCA) and clustering algorithms.

The indexing method may be entropy/adjacency, and is not limited to MVS or PCA. These methods may be used in combination. Entropy measures the ability of a node in a database index to segregate data in a collection (subset of the database) into two or more portions of roughly the same size or complexity. Adjacency measures the ability of a node in a database index to impose structure on these portions that preserve similarity—meaning that similar objects are in portions that are similar (a hierarchical data model where if you want to search for an object near (or contained in) portion A, and if the neighborhood of results of interest is sufficiently large, you also want to search for objects in portion B (or multiple portions) where the data in portion B is more similar to the data in portion A than other data in the database. There is a trade-off between entropy and adjacency—our prior work found that a substantial gain in adjacency can be obtained at the expense of a small decrease in entropy (or increase, depending upon the sign that is used—either information gained from applying the query, or entropy of the resulting portions).

Examples of indexing methods include: (a) indexing of sequences, including text (words) or characters, using a measure of edit distance, which, when properly defined is a metric (and therefore the metric space indexing methods described in Z. Shen's MS thesis work). (b) indexing of sequences of numbers using a measure of the correlation between the sequences, such as $R^2$ or Mahalanobis distance, or inner product of vectors. (c) A similarity between labeled fragments (such as STR DNA) can be defined as described in our database patent family. (d) indexing can be based upon similar hierarchical decompositions of objects, such as the tree of shapes and shape descriptions of segments in images, as used by Y. Pan in his PhD dissertation and the IEEE Trans. Image Processing paper, and (e) 3-d structures such as organic compounds and nanoscale structures can be indexed based upon their structural similarities, using, for example, a spanning tree of an annotated graph representing the structure, with term rewriting rules to determine similarities in structure (creating, in some applications, an equivalence relation on the set of possible spanning trees and a measure of similarity between equivalence classes). This can also be used to define the similarities in the structural descriptions of microscopic particles such as charcoal, pollen, and forams. (f) Finally, indexing can be based upon metric space methods by embedding objects in a metric space for associating objects with elements of a metric space) and using an inverse of the metric, such as an additive or multiplicative inverse, evaluated upon a pair of objects, as a measure of the objects similarity.

As micro-body assemblage data are collected during a survey, they may be archived in a form that can be utilized to populate an operational MAD database. Micro-body assemblage data and their associated information may be coded for insertion in the MAD database. There exist alternate methods of data coding for information related to assemblages to determine a coding framework that best suits the needs of the end user community and supports the requirements of the extant similarity-based indexing and search technologies.

There are significant sources of micro-object, for example, charcoal particle and microfossil, assemblage data in the literature and elsewhere, and data can be gathered, for example, for property and characteristic dimensions. MAD may store associated environmental and geographic information for source identification or attribute application. Additional data collection and analysis efforts can augment the data available in the literature. Automation of portions of the trace particle analysis process may be achieved utilizing a combination of preferential image segmentation and a database of typed reference images that supports content-based image retrieval (CBIR). One or more databases may be developed for Trace Particle Image Recognition (TPIR). For example, charcoal particle and microfossil image data can be collected as part of a literature survey and utilized to evaluate concepts and databases that are soon available or under development.

Design Overview

This section provides an overview of the design of a database that implements efficient similarity-based, or nearest-neighbor search. This means that a request to search the content of the database will return identifiers for objects that are within a specified distance to a reference, or target, object but may not precisely match the target's characteristics. One way to define the term "distance" uses a metric that is defined on the stored objects, and that can quantify the dissimilarity between two stored objects. A metric satisfies the triangle inequality, and this fact can be exploited in the design of a database index. See, for example, the previously cited MS thesis by Z. Shen and the section below titled "Content-Based Image Recognition". However, a measure of distance does not have to be a metric. For example, see U.S. Pat. Nos. 6,741,983; 7,272,612; and 7,454,411 for more general indexing structures that rely upon concepts of "distance" that are not all metrics.

Several metrics may be defined and utilized to satisfy a request to search the database, in which case the returned identifiers refer to objects that are within a specified distance to the et object with, respect to each metric. There are performance advantages that can be achieved when the stored objects can be represented as values in a vector space and/or when a metric can be used as a measure of distance, or to define the similarity of objects, but this is not necessary and is not feasible in all applications. For example, images may be, represented as values in a metric space that is not, a vector space, and DNA sequences and profiles require a looser interpretation of the term "distance" (using mappings that do not satisfy the triangle inequality Even in these applications, high performance databases have been implemented using the methods developed at the University of Tennessee as described in the issued patents. To enhance readability, terms that refer to components and concepts that have particular mea in the design are printed in italics.

Figure 2:
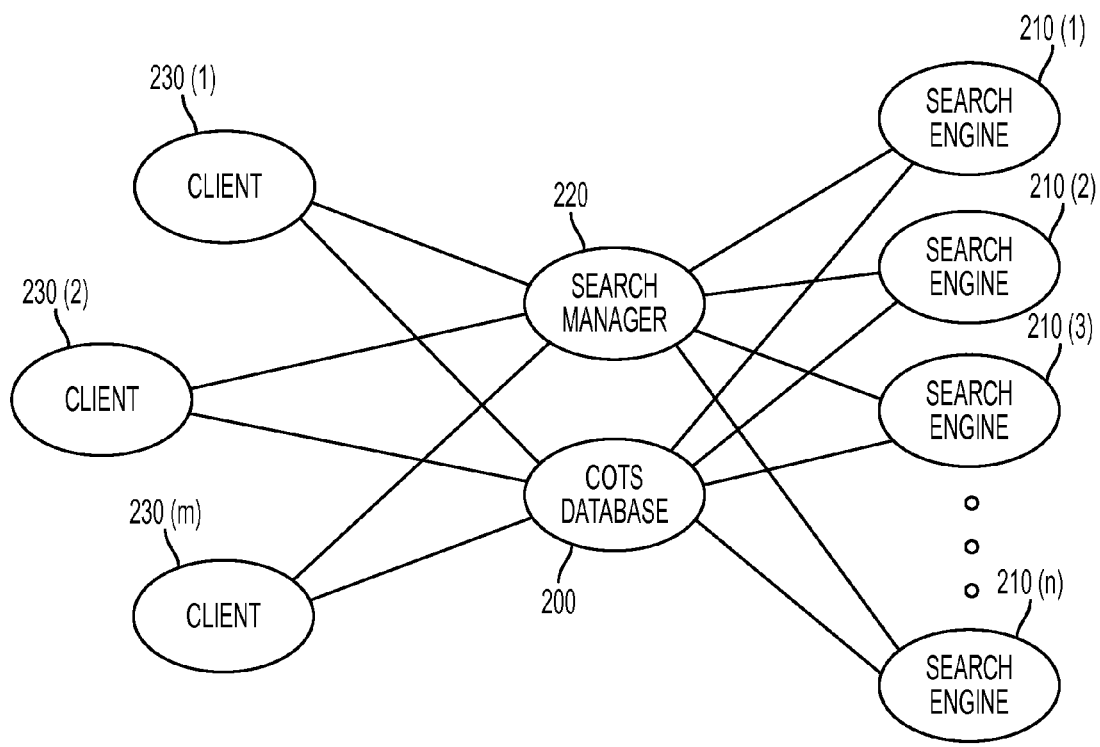
FIG. 2 is a graphical overview of the architectural components of a client-server database supporting similarity-based indexing, search and retrieval according to one embodiment using multiple search engines.

FIG. 2 provides a graphical overview of the primary architectural components of a client-server database supporting similarity-based indexing, search and retrieval using multiple search engines. The database (or preferably a collection of databases) utilizes a client-server architecture that provides simultaneous services to multiple clients, Architectures have been implemented that leverage the advantages of parallel computation, using both clusters of computer nodes and single nodes with multiple processors and cores. A commercial off-the-shelf (COTS) database 200 or a computer, or network file system (referred to herein as a "COTS Database") can be utilized for persistent storage, while the high-performance in-memory indexing and search technologies are implemented in Search Engines 210(1) to 210(n) that operate as cooperating threads or tasks within the overall architecture. A Search Manager 220 provides coordination between the Clients 230(1) to 230(m), a COTS Database 200, and Search Engines 210(1) to 210(n), as well as the initial connection protocol for the Clients 230(1) to 230(m). The application can be parallelized by allocating separate computational resources to each component, such as a Search Engine 210(1) to 210(n), by allocating multiple computational resources to any component, as occurs in a Search Engine 210 that utilizes multiple threads, or using a combination of these methods. Communications among components in a parallel implementation may be effected using a communications medium such as a computer network or using shared memory.

Figure 3:
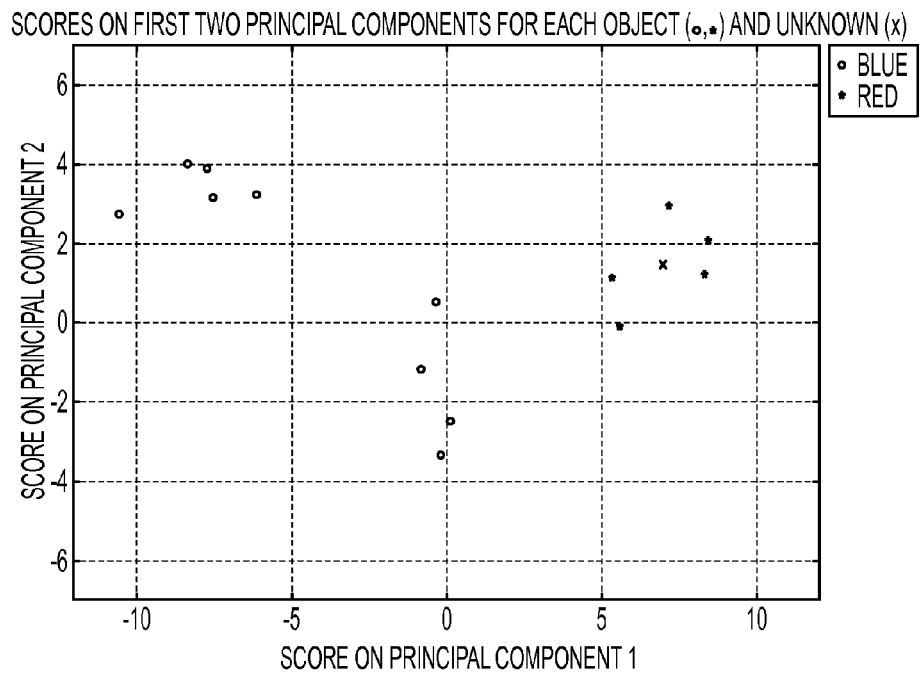
FIG. 3 provides sample "s" attribute vectors associated with stored objects and a target object denoted by "x" defined by first and second principal component vectors forming a cluster.

A simple example illustrates the design concept. Suppose a database contains 14 objects, and that each object is described by a vector of attributes that are real-valued. Preprocessing of data can be by data extraction or filtering, such as low or high pass filtering, or Kalman filtering or extended Kalman filtering (both using a model of relationships among members) or parameter identification. These attributes can be analyzed using multivariate statistical analysis (MVS), for example, using principal component analysis (PCA) as described in a subsequent section, to determine a smaller dimensional (two in this example) subspace of the attribute space in which the objects can be clustered into groups (three in this example). In this simple example, assume that a measure of similarity between objects, using the projections of the attribute vectors onto the principal component basis vectors for the subspace, is the inverse of Euclidean distance between points. This situation is illustrated in FIG. 3 showing projections of sample 's' attribute vectors associated with stored objects (o, •) and an unknown target object (x) onto the subspace defined by the first and second principal component vectors. The projection shows three clusters of objects, of which one contains objects most similar to the projection of the target object's attribute vector, a cluster of five "•" points at the right of FIG. 3 with the target object's vector x in the center. In FIG. 3, the rightmost cluster in the figure (containing data points corresponding to five objects) is the cluster of greatest interest.

Figure 4:
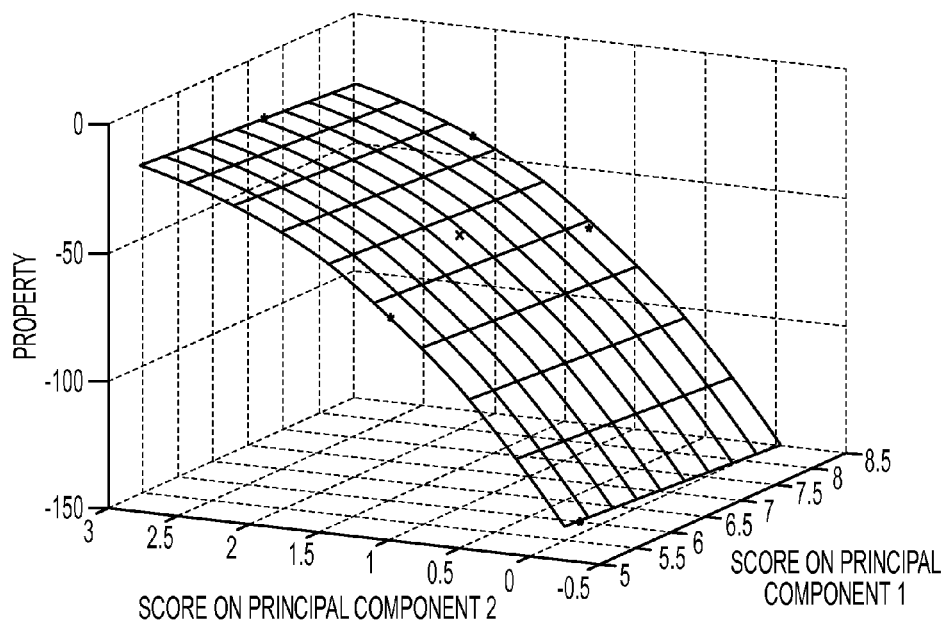
FIG. 4 illustrates a modeled behavior for the cluster of FIG. 3 using data from selected reference objects (o, to estimate the property's value for target object x of FIG. 3.

The right-most cluster in FIG. 3 illustrates the effect of a similarity search operation on the database. The point depicted by the 'x' symbol in FIG. 3 corresponds to a newly acquired target object, and the search operation identified five stored objects that are most similar to the target using the similarity measure defined by the combination of a projection operation onto the subspace and the Euclidean distance metric. Suppose the objective is to estimate a property of the target object from the property's values for similar objects. This is illustrated in FIG. 4, where the vertical axis represents the value of a single real-valued property. An algorithm is applied to the similar objects' data, as represented by the gridded surface, to provide an interpolated or inferred estimate of the property for the target, represented by the vertical height of the 'x' symbol in FIG. 4 (toward the center of the curved planar space).

A feature of the technical solution of the embodiment is the ability to rapidly select objects from a large database that have similar attributes to those of a target object of interest even when the database contains millions to hundreds of millions of objects. This enables the rapid modeling and prediction of a target object's properties using data from the set of similar objects.

Figure 5:
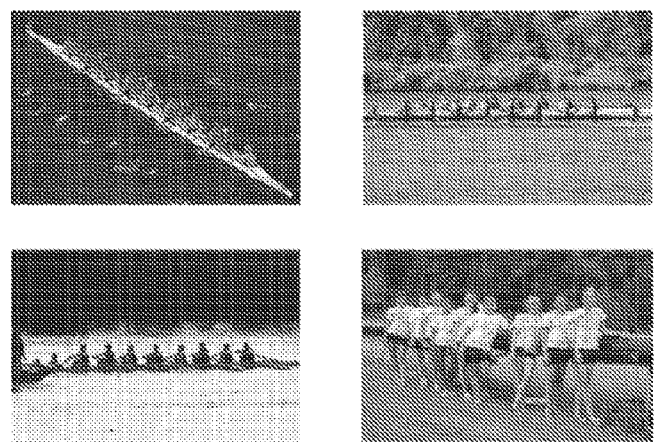
FIG. 5 provides sample images from a database of over one thousand images for rowing competitions.
Figure 6:
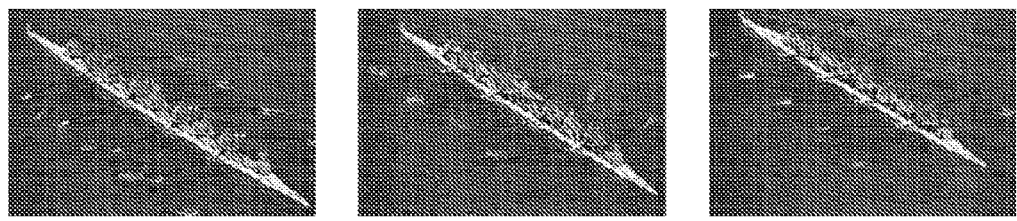
FIG. 6 provides images retrieved by a CBIR process of one embodiment for a racing
Figure 7:
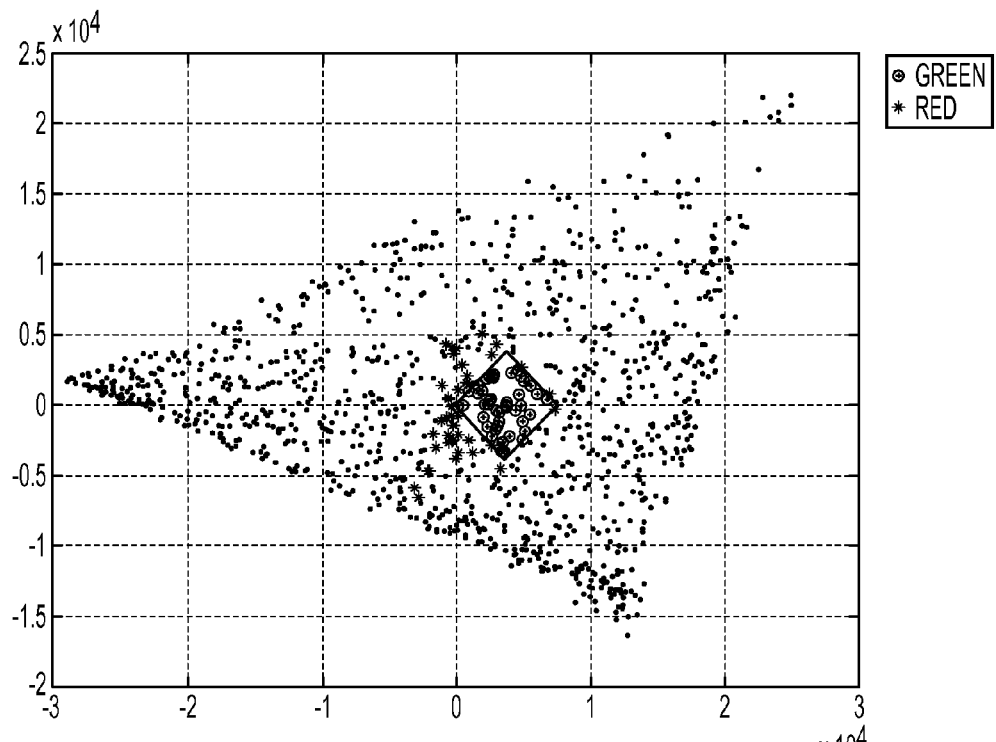
FIG. 7 shows a projection of image attributes onto two principal component axes, showing data which satisfy the search criteria within the central area and marked as such.

Referring to FIGS. 5-7, a slightly more complex example further illustrates this process. A database was assembled of roughly 1,000 images taken by Birdwell at rowing competitions, along with attributes extracted from each image. The similarity-based database index was constructed using the attribute value set and utilized to rapidly identify objects (images) within a specified metric distance from a target image. FIG. 5 shows four sample images from the database, illustrating the variety of image data. The top left image in this figure was utilized as a target object in a similarity-based search and retrieval operation, yielding images satisfying a specific (fairly stringent) match criterion. The images retrieved using this search are shown in FIG. 6.

FIG. 7 shows a plot of projections onto two principal component axes of the attributes of all images stored in the database, with each image shown as a dot or space. In this example, the retrieval operation was to find images that had attribute values within a specified $l_1$ norm of the attribute value of a target image, where the attribute is vector-valued. The database index allowed the search operation to be narrowed down to the set of dots shown in a box, where the darker outlier • (RED) dots represent images that satisfy the final similarity constraint. One measure of the efficiency of the database search operation is the relative size of the set of outlier • (RED) dots compared to the set of (green (within the square)) colored dots, since red dots outside the square represent images that had to be visited by the search engine to rule out their inclusion in the result set (within the box). To continue the analogy with modeling, the images that correspond to the green dots (in the square) shown in FIG. 7 would be used in a predictive model to infer properties, such as the classification of a pollen grain or diatom, in a target image. The rapid and efficient identification of this set of images is highly desirable, since image operations, compared to operations on the database index, are substantially more costly. As can be seen in this example, the search methodology is highly effective.

In these examples, the images in the database were processed by extraction of vectors of attribute values, which were further analyzed using principal component analysis, as described in the section titled "Multivariate Statistical Analysis and Data Clustering", to determine projections onto principal component subspaces most conducive to clustering of like images and indexing. The remainder of this subsection provides a brief overview of the concepts utilized to construct database indices that support similarity-based search and retrieval methods, after which the basics of the statistical analysis and clustering, procedures utilized in the indexing method are presented.

Views

One aspect of one embodiment of the database architecture is the View, which provides the basis for the implementation of a Search Engine. Referring to FIG. 2, there may be a plurality of Search Engines 210(1) to 210(n). The COTS Database 200 of FIG. 2 can contain an arbitrary collection of stored objects, which can be arranged in a relational structure that, although a factor in the performance of the database, does not have a direct relationship with Views or Search Engines 210. For each View, a specification determines the set of objects in the COTS Database 200 that can be accessed using that View, called the Viewable Set. This means that in general not all stored objects may be accessible from a single View. This is reasonable, since some objects can have, for example, images that are indexed using information derived using a View, while other objects do not.

A View includes a specification for an Attribute Set, which is the set of attributes that can be extracted from any object in the Viewable Set. An attribute value can be any data structure; examples include vectors, sets, and trees of data objects. For example, a "tree of shapes" description and organization of the segments that correspond to a portion of an image can be an attribute value. In a DNA database the attribute value may be a DNA base-pair sequence, an edit sequence, or a collection of alleles associated with loci within an organism's genome. At its most trivial, an attribute value is a number or a symbol. The Search Engine 210 that utilizes a View indexes its attribute values, and the attribute values are stored in the Search Engine's address space. Attribute values are derived from stored objects and can be utilized for rapid comparison of the objects, but note that while two identical objects will have identical attribute value sets, identical attribute value sets do not imply that their corresponding objects are identical.

A View defines an Extractor, which is an algorithm that can be applied to a stored object within the Viewable Set to produce one or more attributes, each of which is a value in the Attribute Set. The Search Engine associated with a View typically applies the Extractor to all stored objects that are in the Viewable Set (as they are stored), and therefore contains within its address space at least one attribute value for each stored object.

A View defines at least one Partition on the Attribute Set. Each Partition defines a Function from the Attribute Set to a finite set of categories, or labels, and optionally to a metric space. A metric space is a set of values that has an associated distance function d(x,y) that assigns a non-negative number, the distance, to every pair of values x and y in the metric space. The distance function must satisfy three properties: (i) d(x,y)=0 if and only if x=y for all x and y, (ii) d(x,y)=d(y,x) for all x and y, and (iii) d(x,y)+d (y,z)>=d(x,z) for all x, y, and z. If the metric space is defined, the Partition assigns a category or label to each element of the metric space. Typically, this assignment is accomplished in a manner that allows an efficient implementation of an algorithm to compute the category associated with any value in the metric space. The Search Engine 210 utilizes Partitions to implement a "divide and conquer" search and retrieval strategy, isolating possible matches to a specified request to search to subsets of categories and implementing a tree-structured index to leaf nodes that contain attribute values and identifiers of stored objects. The advantage of this approach over the capabilities offered by traditional database technologies is that it supports indexing methods that allow similarity-based search and retrieval and depend upon both multivariate and multi-valued (set-valued) quantities; two examples are described in U.S. Pat. Nos. 6,741,983; 7,272,612; and 7,454,411.

The Function typically implements one or more data reduction steps, such as are described in the section titled "Multivariate Statistical Analysis and Data Clustering". The intent of the data reduction steps is to determine a minimal set of attribute values that enable efficient partitioning of the stored objects into disjoint collections of roughly equal size, and, where feasible, to cluster like objects by assigning similar attribute values. Therefore, the Function can effect a transformation of the information associated with the stored object into a useful form that enables at least one of clustering, partition and indexing. As described later, this is typically accomplished through a combination of proper selection of data encoding methods and statistical analysis, either using previously acquired and stored data or using a dynamic process as new data are acquired and stored.

Properties

Properties are similar to Views but are not utilized to construct indices or Search Engines 210. A Property has specifications of a Viewable Set of objects and an Attribute Set of attribute values that those objects may possess. Unlike Views, attribute values associated with objects are provided by an external source rather than computed by an Extractor. For example, an attribute value can be a manufacturer or a geographic coordinate where the object was found. A typical application would attempt to infer property values for newly acquired objects using a search for similar objects stored in the database 200 and a model of how property values vary or correlate with other attributes of the object.

Search Engines

Search Engines 210 implement high-performance indices for the database 200 of stored objects that allow objects similar to a specified target to be located and retrieved. Each Search Engine 210 corresponds to at least one View into the stored data. (An example of a search engine that utilizes two views is provided in U.S. Pat. No. 6,741,983, where a partition can utilize information from two DNA loci.) Two possible Search Engines 210 implement indices of electrical, electromagnetic or acoustic spectra data, and micro-body, for example, charcoal particle or microfossil, assemblage data, image data and time series data, i.e. property data of a type for comparison with like previously stored data. A Core Database 200 functionality is capable of supporting more advanced Search Engines 210, For example, a first Search Engine 210 may be defined that indices surface sculpturing on pollen grains, allowing reference pollen data to be retrieved that describe grains with similar texture to a target sample. Other Search Engines 210 may be defined to index the data based upon overall shape, size, and physical attributes such as apertures. Still other Search Engines 210 may be defined to index the data on spectral characteristics among acoustic, electrical or electromagnetic data received, for example, via a passive directional antenna.

Referring again to FIG. 2, a Client 230 can specify a search context that requires similarity in size, shape, apertures, and texture, which would be interpreted by the Search Manager 220 to require searches using multiple indices (Search Engines) 210 and subsequent analysis and combination of the results. There may be a plurality of Clients 230. For example, a reference to a stored object could be returned only if it were similar to the target object in at least three of the four attributes. Another Search Engine 210 could implement an index into spectral data obtained from physical components, retrieving information about stored objects of that type that have similar spectra. Information describing both types of objects (and others) can be stored in the underlying COTS Database 200, whose primary functions are to implement persistent storage and provide the usual capabilities of a relational database.

Each Search Engine's index is tree-structured. Operations begin at the tree's root, and paths of descent from each node of the tree are excluded if no possible matches to the current search specification and target can exist on those branches. Leaf nodes of the tree contain attribute information and references to objects within the COTS Database 200. The attribute data can be used to exclude many referenced objects as possible matches, leaving a small number of objects that require additional analysis—and possibly retrieval from the COTS Database 200—to determine the final set of matches. In some cases it is possible to maintain a complete copy of each object within the address space of the search engine, if this is required for high performance applications. The Search Engines 210 can support multi-threaded operation, allowing the simultaneous processing of requests from multiple clients, or from a single client that has submitted several requests. In one embodiment, write operations, which store new data in the COTS Database 200 or modify the index structure, block other queries to maintain the integrity of the index structures. These operations require coordination across Search Engines 210, or within the Search Manager 220, because a write initiated in one index may require modification of data within another index that can access the same object(s). An alternate embodiment allows non-blocking writes with subsequent coordination among processes that access overlapping information sets to resolve conflicts or inconsistencies. Referring to FIG. 2, the Search Manager 220 is shown connected to both Clients 230 and Search Engines 210.

Models

The utility of the similarity database lies in its ability to predict characteristics of newly acquired samples using a cumulative database of previously gathered and analyzed materials. It is unlikely that an exact match will be found to any particular target, but it is possible to model Properties of the new sample using the Properties of similar stored samples. This may be accomplished using interpolation and either deterministic or statistical models, which may be either single or multi-variable models, or more complex models may be utilized, as described earlier. The similarity search becomes the first step in this process by restricting consideration of previously stored object data to those that are most similar to a target object.

A Model includes a specification of Properties, which identifies the Viewable Set of stored objects to which the Model can be applied and the Attribute Set that can be utilized by the Model. The model also specifies an Algorithm to be used to compute values of a subset of the Attribute Set for a target object, given a set of stored objects and the target object. The Model may incorporate an optimization method or an approximate optimization method to adapt or fit the Model to a subset of stored objects in the Viewable Set. Note that the attribute values can include computed estimates of errors, in addition to the estimates of values such as geographic location, manufacturer, or geographic characteristics such as expected nearby land features. Note also that geographic location and characteristics could be utilized in an interface to a Geographic Information System (GIS) such as ARCinfo.

An important feature of a Model is its ability to adapt to new information. As additional objects are acquired, analyzed, and stored in the database, their associate data are available to the Model's Algorithm. A search for stored objects and inferred information relevant to a new object is expected to provide more precise answers as additional data are acquired and stored in the database system. In all cases, the Model should utilize current stored data from objects that are most similar to a target object's characteristics to develop inferences.

Filtering can be used to assess the quality of a model's fit to data (degree with which it accurately describes the relationships among the objects). For example, one can examine the residuals or innovations processes in filters to determine how accurately the filters model or match the behavior of the group of objects. These filtering methods are well-known in the field of electrical engineering (subfield of systems and controls), and are also utilized in statistics and business applications.

Similarity measures can be used to cluster by similarity and then apply model(s) to clusters to test hypothetical relationships—with or without a target object. The target may be a member of the database 200. For example, one may perform searches for similar objects contained in the database for all members of the database 200.

SUMMARY

A purpose of the present design is to provide a predictive modeling capability that is based upon collected reference data. The collection is dynamic: As new objects are stored in the system, the quality of inferences improves. The design is not bound to a single modeling paradigm: Models may be as simple as a linear interpolation or a lookup in a database tables but they may be much more sophisticated, using multivariate data and optimization, and restricted only by what can be coded in a standard programming language to utilize the structured data associated with stored objects. Similarity based search enables the Models to utilize the data that are most similar, using multiple factors, to a target object, and, since all stored data are available to the Search Engine 210, the most recent data are utilized, allowing the predictive modeling capability to remain up to date at all times. The patented and patent pending technologies that have been developed at the University of Tennessee allow high-performance similarity-based search strategies to be effectively implemented even for very large data collections, with demonstrated scalability into the hundreds of millions of stored data objects and demonstrated performance of hundreds to ten thousand completed searches per second utilizing readily available off-the-shelf hardware.

Multivariate Statistical Analysis and Data Clustering

Now a method that uses multivariate statistical methods to determine clusters is described that can be utilized to partition portions of a database into groups with similar properties and of roughly equal size; see, for example, U.S. Pat. No. 6,741, 983. As a result, this method generates partition information that can be incorporated within or associated with an arbitrary node in a tree-structured database index. The figures are from applying this method to DNA profile data based upon amplification of short tandem repeat (STR) loci.

The raw data associated with objects to be stored (or retrieved) in the database 200 are represented as vectors of numbers. For the DNA database, these numbers are binary and represent the presence (binary "1") or absence (binary "0") of a specific STR allele at a locus. This encoding scheme is often used for measurements that assign categories, such as "rough", or "elliptical", or that represent the presence or absence of features in raw data, such as signal peaks. Measurement can also yield floating-point, or real, values, in which case the raw values, either scaled or un-scaled, can be utilized, Principal Component Analysis (PCA) of the data is utilized to decrease the dimensionality of the raw data by identifying directions of maximum variation in the original data and transforming the data to a new and lower dimension coordinate system. For use in a database, coordinates are desired that result in discernable and clusterable patterns in the reduced data space. Distinct clusters, usually less than 10, can be established using a clustering method, such as k-means; see, for example. J. T. Tou and R. C. Gonzalez, *Pattern Recognition Principles*, Addison-Wesley, Reading, Mass. 1992 or k-modes or prototypes; see, see, also, Z. Huang, "Extensions to the k-means Algorithm for Clustering Large Data Sets with Categorical Values," *Data Mining and Knowledge Discovery* 2, 283-304 (1998). The membership of each cluster is then identified and recorded. In the DNA application, each STR profile belongs to one and only one of these clusters. Thus, all of the DNA profiles in the database can be partitioned into these clusters. This partitioning occurs at each level of the tree-structured database index, enabling a "divide-and-conquer" approach to data retrieval. When searching for data matching a target's characteristic, the target can be classified into one of these clusters at each level of the tree. A subsequent search can be restricted to members within this cluster. This reduces the search problem by approximately one order of magnitude at each level of the index tree, as the search descends the tree.

Principal component analysis (PCA) is a method for analyzing a matrix of high dimension, revealing correlated information and representing it with a much lower dimensional matrix without sacrificing significant information contained in the original data matrix. PCA involves a rotation from the original frame of reference to a new frame of reference, whose axes are given by the principal components from the PCA. The first principal component represents the direction along which the variance exhibited by the original data points is maximized and is made up of a linear combination of the original variables. The second principal component, orthogonal to the first, represents the direction along which the remaining variance is maximized. Additional principal components are defined in a similar fashion.

Figure 8:
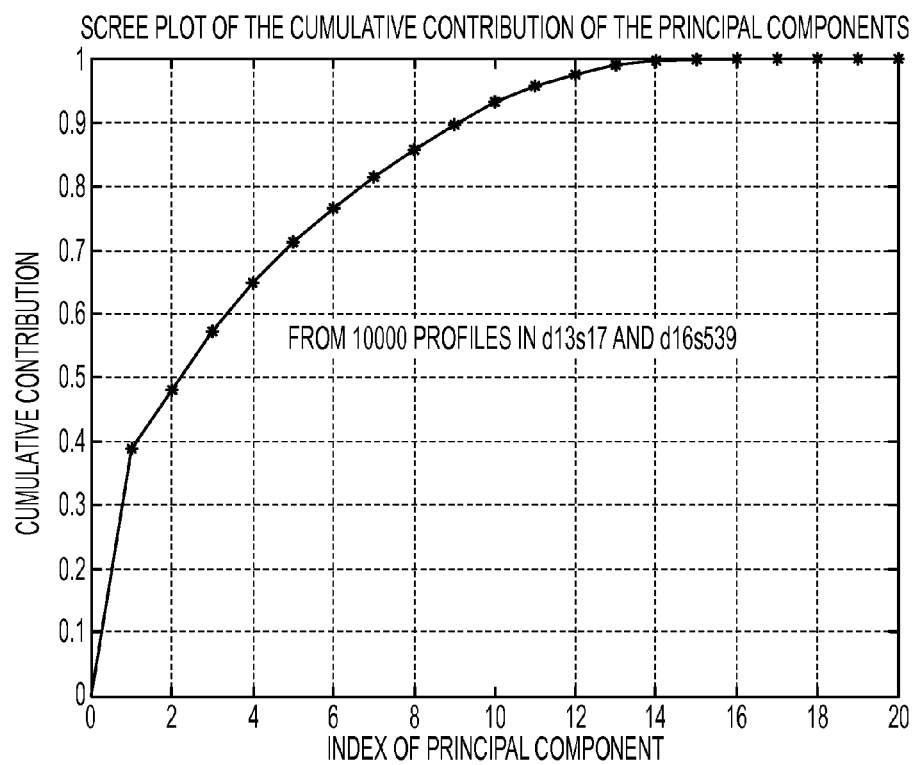
FIG. 8 shows a scree plot of cumulative contributions made by a plurality of principal components.

To implement PCA, the Singular Value Decomposition (SVD) method can be used to decompose the data matrix, X, into the product of three matrices, in which the columns of the matrix, V, are referred to as the "principal components" of the SVD of the data matrix, X; see, for example, G. Strang, *Linear Algebra and its Applications*. 4$^{th}$ ed., Brooks Cole, Florence, Ky., 2005. Thus, $$X=U\Sigma V^T$$

where U and V are orthogonal matrices, and Σ is a diagonal matrix with non-negative elements arranged in descending order. The columns of V, being the principal component vectors, represent the coordinates or basis of the axes of the new frame of reference. The ratio of the square of each singular value to the total sum of squares of all the singular values represents the percentage to the total variation contributed by each principal component, A Scree plot can be developed to show the cumulative ratio of this measure an example is shown in FIG. 8.

Since the original data are assumed to be heavily correlated, and the singular values are arranged in descending order, one can make a decision as to how many principal components to keep in building the PCA model to represent the original data. The discarded data along the remaining principal components are regarded as less important and are ignored.

Each principal component is of unit length and orthogonal to all other principal components. The principal components are the columns of the right singular matrix, V, of the singular value decomposition (SVD) of the data matrix, X, above. Each principal component is expressed as a linear combination of the original variables, with the entries of the principal component expressing that particular linear combination. The absolute values of all entries are less than or at most equal to 1. Therefore, those entries with relatively large values indicate that the corresponding original variables exert greater influence along this principal component's direction. The variables with correspondingly heavy weights are also the ones being correlated in the original data set.

If the columns of the data matrix, X, are not first mean centered, such that the mean of each treated column is zero, then the first principal component reflects the average values of the variables represented in the new principal component frame of reference. It is then the next few principal components that serve to differentiate between DNA profiles. Therefore, mean centering is an optional step that provides no additional capability and is not performed here.

After the principal components are found, each data vector can be projected onto each principal component. The projected vector is referred to as the scores vector for each sample. The length of the scores vector indicates how closely aligned each sample of that data is to that principal component. The bigger the projection, the better the principal component represents the data vector. Thus, data vectors with comparable projections onto a principal component can be regarded as "similar" to each other, with respect to that principal component. Those data vectors with high projected values onto the principal component indicate that these data vectors are highly aligned with the principal component, therefore representing more of the original variables which are heavily weighted in that principal component. Similarly, projections of data vectors onto each of the succeeding principal components can be carried out to get the scores and their projections onto those principal components.

Figure 9:
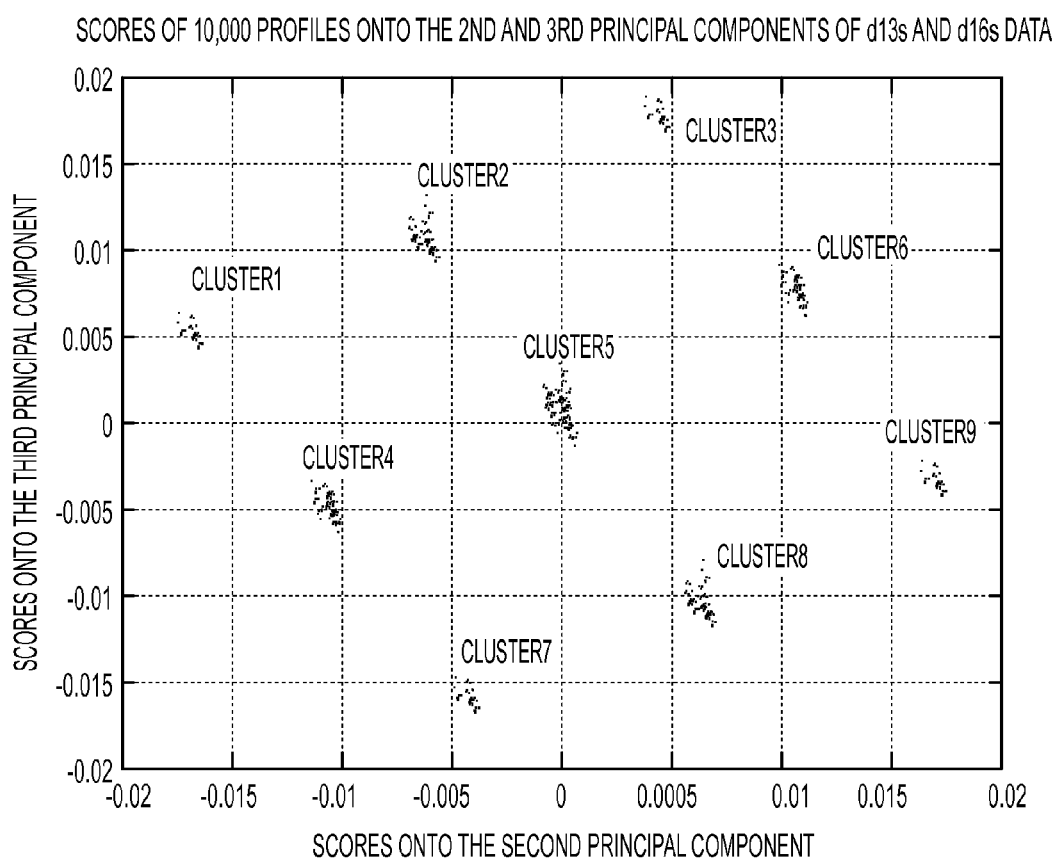
FIG. 9 shows Mahalanobis scores for depicted principal components of 10,000 data profiles for alleles in d13s317 and d16s539 in nine clusters.

Because of the different degree of variation exhibited by the data vectors along the different principal components, normalization is necessary, such that normalized distances from the origin to each projected point can be meaningfully compared. The Mahalanobis distance measure is employed, in which each projection is divided by the corresponding singular value. The Mahalanobis distance scores are calculated as follows:

$$\text{Mahalanobis Scores}=XV\Sigma^{-1}=U$$

where X represents the original data matrix, and U, Σ and V are from the SVD of X. Postmultiplying X by V performs the projection of the rows of X (DNA profiles) onto the principal components, with the projected vectors represented with respect to the principal component axes. Postmultiplying XV by $\Sigma^{-1}$ scales each column of XV by the inverses of the corresponding singular values contained in Σ. A two dimensional plot can be used to show the scores onto principal components i and j. In plotting the scores plot in, say PC2 and PC3, it is the row entries from the second and the third columns of the Mahalanobis scores matrix (the U matrix) that are plotted in a 2-d plot. Henceforth, the Mahalanobis scores shall simply be referred to as the scores. An example of such plot is shown in FIG. 9, which shows the scores for 10,000 DNA profiles with alleles in the d13s317 and d16s539 short tandem repeat STR loci onto the 2$^{nd}$ and 3$^{rd}$ principal components. It is in such a scores plot that clusterability of the sample points is examined; there were nine clusters in this case.

An aspect is why certain principal component axes, taken for particular portions of the raw data, exhibit good clustering properties, while others may not. The answers lie in both the statistical properties of the data and the encoding method. For DNA profiles, loci with allele probabilities concentrated at just a few alleles (2 to 4) are good candidates for generation of distinct clusters. The reason is that with most of the data having only a few alleles, the joint 2-loci allele distributions that were used tend to concentrate in those allele pairs with relatively high probabilities of occurrence. Thus, fewer, and more distinct, clusters tend to be formed. The encoding also plays a role. For example, discrete variables that are numerically encoded tend to enforce a more distinct separation between clusters.

Consider the allele distribution patterns in a large DNA STR data set. If for a specific locus, the probability densities concentrate in only a few, for example 3 out of 10, alleles, then the majority of the DNA profiles in this data set will have alleles for that locus, corresponding to those with high probability densities. However, some, though in the minority, will still have alleles with low probability densities. Thus, the variance among the DNA profiles associated with this locus will be higher than those where a large number of alleles have comparable but low probability densities. The large variance exhibited by this part of the data will be picked up by the leading principal components of the original data matrix. Recall that the principal components of a matrix X are given by the right singular vectors of X, after SVD (the columns of the matrix, V). For a matrix without any column mean centering, the first principal component generally gives just the average of the overall data, and therefore is not useful in differentiating between the points. The second principal component, therefore, is the one that gives the direction along which the variance exhibited by the original data matrix is maximum: the third principal component gives the direction that captures the next maximum variance, after the component along the first and second principal component have been subtracted off from the original data matrix.

Figure 10:
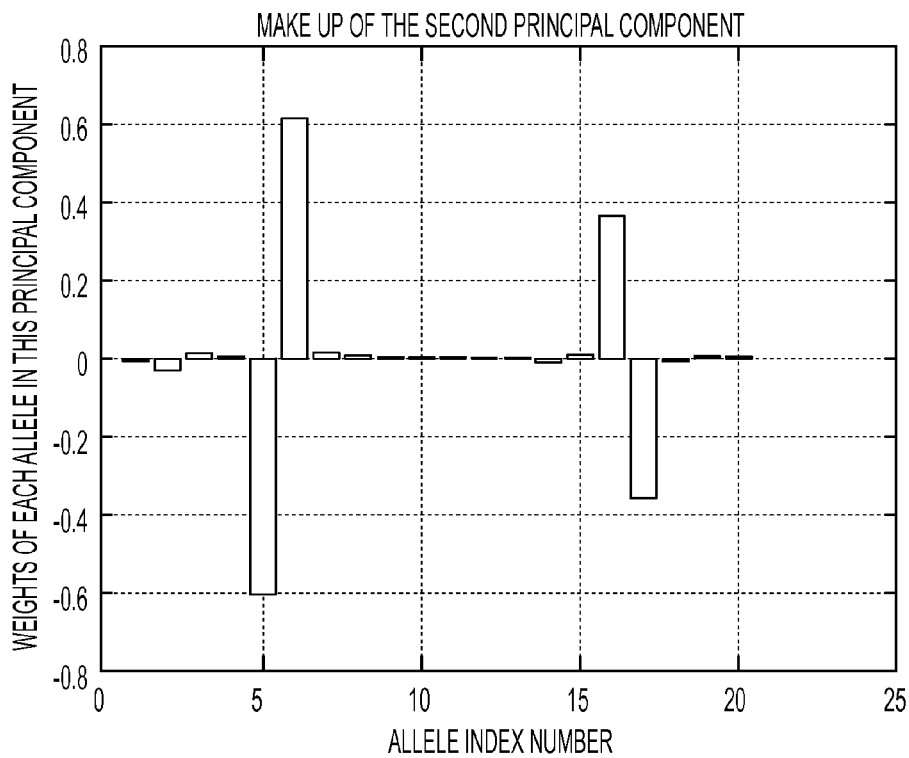
FIG. 10 shows the make-up of the second principal component for the d13s-d16s data set.
Figure 11:
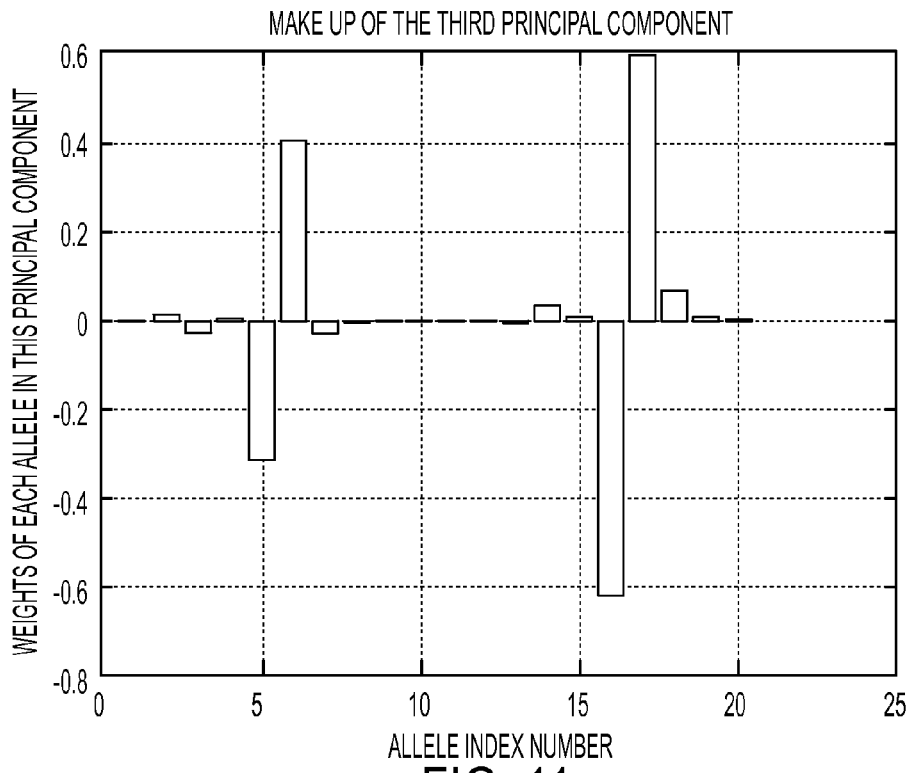
FIG. 11 shows the make-up of the third principal component for the d13s-d16s data set.

As a result of the above reasoning, the first few leading principal components after the first should exhibit a large contribution from those original variables (i.e. the alleles) where the probability densities is large. FIG. 10 and FIG. 11 show the make-up of the second and the third principal components of the 10,000 DNA profiles at the d13s317 and the d16s539 loci. It is clear from these figures that two alleles are the dominate factors at each locus in the scores for each principal component. Notice the opposite signs of alleles 11 and 12 of each locus in each principal component (PC). If a cluster of the scores of the DNA profiles projects highly onto the positive direction of PC2, then it means that most members within this cluster have the presence of allele 12 (the second tall bar of FIG. 10) of d13s317 and allele 11 of d16s539 (the first tall bar of d16s539 of FIG. 10), and the absence of allele 11 in the first locus and the absence of allele 12 in the second locus, since the signs associated with the latter pair are negative.

The nine distinct clusters can be established analytically by the k-means clustering algorithm, which typically works well for naturally occurring data. Other clustering algorithms known in the literature may be used. Clusters identified by k-means were validated by visual inspection tier the DNA database. Memberships within each cluster were analyzed to determine the similarity among the members. It was observed that clusters differ in the combination of alleles at each of the 2 loci that are dominant. From the make-up of the principal components, the projections of members of each cluster onto each principal component can be predicted by looking at the pattern of alleles present and absent in the members of the clusters.

Because the most probable alleles for the d13s317 locus are alleles 11 and 12, and the most probable alleles for d16s539 are alleles 11 and 12, the clusters correspond to DNA profiles with various combinations of presence or absence of these dominant alleles at these four positions. Boolean expressions can be written that form logical tests on the data to determine cluster assignment. For example, a Boolean expression testing for membership in one of the clusters is "(d13s317-allele11) and not (d13s317-allele12) and not (d13s539-allele11) and (d13s539-allele12)", where the terms in parentheses are logical variables that are true if the corresponding allele is present and false otherwise. Boolean expressions can be rewritten in various forms and simplified according to methods that are well known from the fields of Boolean algebra and logic circuit design.

Figure 12:
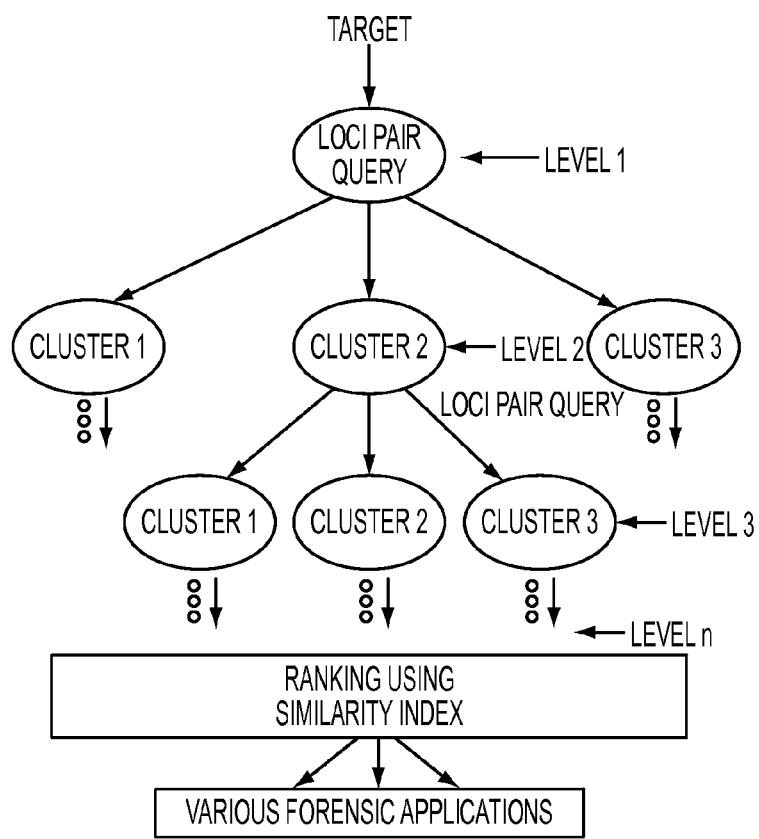
FIG. 12 provides a graphical depiction of a database index constructed from the results of multivariate statistical analysis and a ranking strategy.

The Boolean expressions that describe each cluster form a test that can be applied to any data record. These tests can be utilized to form a decision tree that sequentially applies tests to assign the record to a cluster, and therefore to a descent path through the database index, using the methods of inductive inference that were pioneered by J. Ross Quinlan; see, for example, "Induction of decision trees," *Machine Learning* 1:81-106, 1986. In this case, each node of the database tree that utilizes clusters derived from the multivariate statistical analysis method would contain a decision tree specifying the sequence of tests to be applied to DNA profile targets at that node, and the database tree can be rewritten by expanding these nodes and incorporating the decision trees nodes into the database tree. A graphical depiction of the database index that results is shown in FIG. 12. FIG. 12 is a graphical depiction of a database index dynamically constructed from the results of multivariate statistical analysis, combined with a ranking strategy based upon a measure of similarity between objects, to address the needs of various forensic applications.

This method has been utilized for both DNA profile and image indices (as discussed later). PCA is utilized to reduce the volume of the raw data, and to focus attention upon a small number of data attributes (principal components) that cause the data to form clusters, resulting in a decomposition of the database. It is possible, however, to utilize too much information, in which case clustering will not be achieved. For example, from our previous work, the use of PCA methods to analyze allele information for 16 loci simultaneously does not exhibit clustering. Thus, a key discovery of this work is that it is important to limit the application of PCA methods to a portion of the available information to achieve good clustering results. A subsequent data fusion step can be employed to combine information found by searches of multiple indices, in a manner similar to the methods utilized in commercial databases to combine the results of searches of two or more tables. In the DNA database used to illustrate the method, the information at each level of the database index tree was limited to allele data for two loci.

The factors that determine good clustering and the reason for the clustering have been presented and briefly discussed. Successive partitioning using different Views (2-loci combinations in this example) at each round very rapidly reduces the number of objects present within each cluster. Partitioning by PCA clustering can be inserted into suitably chosen non terminal nodes of the database index tree, to search for matching data objects against a target object. After passing through this node, the number of candidate objects that remain to be searched is reduced by approximately one order of magnitude. (Seven to nine clusters usually resulted from PCA clustering of the DNA profile data, in which the clusters are about equal in size.)

A very high level of performance is typically achieved using a database constructed in this manner. First, the database's tree-structured index can be maintained in memory, as well as vectors of attributes for the stored objects. Second, the operations that must be performed at each node of the index are a small number of vector inner products (to obtain the scores for a search target for each principal component used by the node), followed by evaluation of a set of Boolean expressions involving a small number of comparisons. Depending upon the complexity of the application, search times for exact matches of microseconds to 10s of milliseconds are feasible for a database that resides completely within the computer's memory, with longer times required for inexact (similarity-based nearest neighbor) search. The methodology exhibits good scalability, with the largest runs to date involving over 100 million stored objects. Search times typically scale logarithmically with database size. The search time varies with the target and the portion of the database that must be searched (which is determined by the data associated with the target).

Figure 13:
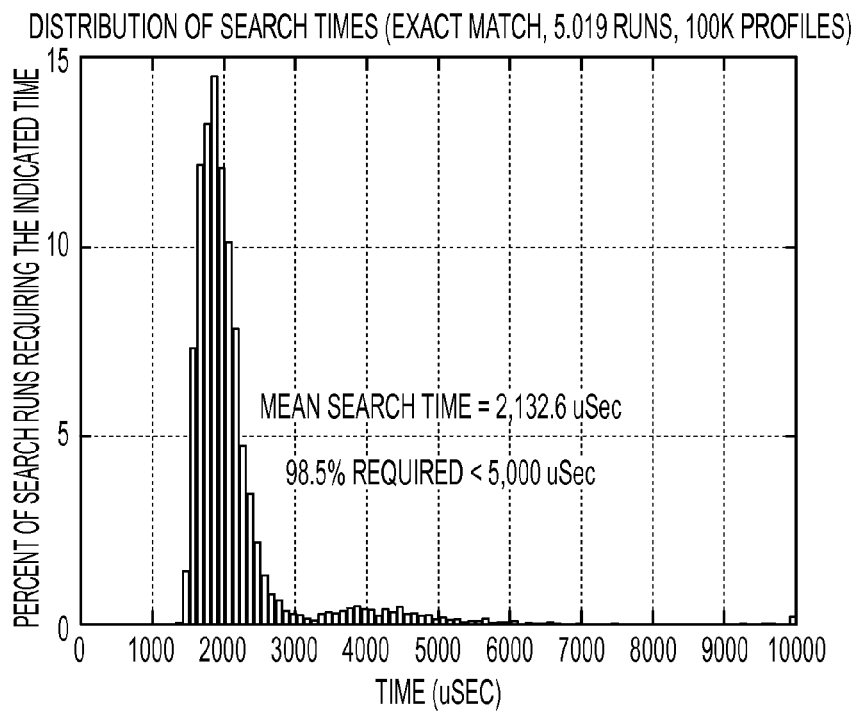
FIG. 13 provides a histogram of times required to search a 100,000 DNA profile database for an exact match to a profile.

FIG. 13 shows a histogram, using run data from 1999, of search times for an exact search to a specified DNA profile (5019 runs) of a 100,000 DNA profile database, which an average search time of approximately 2.1 microseconds. The methodology can also be parallelized, as described in U.S. Pat. No. 7,454,411, using either a symmetric multiprocessing platform or a computer cluster.

Analysis of Micro-Particle Assemblages

While rare finds of dinosaur and mastodon bones justifiably attract public and scientific interest, knowledge databases related to past environments and the organisms that populated them come from data for much tinier fossils that are invisible or nearly so without magnification. Such microfossils are preserved in vast numbers in modern and ancient freshwater and marine sediments and soils found worldwide, and are widely used by researchers interested in a variety of themes related to the evolution of earth's environments and biota. In the micro-body assemblage database, there may be relational property data for four microfossils pollen grains, charcoal particles, diatoms, and foraminifera that are key indicators of past climate and environmental change during the Quaternary and earlier periods of earth's history. The utility of these microfossils as indicators of past environments stems from 1) their high abundance in nature and 2) the fact that their distributions are strongly correlated with geographical and environmental factors. These two characteristics make these microfossils important as trace particles in forensic and other efforts aimed at determining the source area of objects of interest.

Pollen grains are the structures produced by plants to transfer the male gametes to the female part of a flower. Pollen grains vary in size from about 5 μm to more than 200 μm, but most grains are between 20 and 50 μm; see, for example, R. O. Kapp, O. K. Davis, and I E. King, *Pollen and Spores*, $2^{nd}$ edition (2000), American Association of Stratigraphic Palynologists Foundation. Pollen grains vary in shape, surface texture, and the number and arrangement of apertures through while the pollen tube can grow to effect fertilization. These variations follow taxonomy, and make it possible to identify the plants that produced the pollen grains. Most pollen grains can be identified to family or genus, and occasionally it is possible to identify pollen grains to species. Knowledge of the climate, soil, and other environmental factors necessary to support growth of the parent plant provides a basis for interpreting environmental conditions from the presence of the pollen grain. Although pollen grains of some wind-pollinated plants (such as pines) may be carried long distances by wind, many of these grains fall near the parent plant. Experimental and other studies reveal that many pollen types are not widely dispersed, such that their presence in an assemblage of pollen grains indicates that the plant was growing near the sampling site. Even given the potential long-distance dispersal for the pollen of some plants, the overall pollen assemblage, expressed as the percentage representation of different pollen taxa, has been demonstrated to show a high correlation to the vegetation and environmental conditions of the sampling area. This has been shown in numerous studied carried out by palynologists seeking, to calibrate long-term pollen records of environmental change by studying the modern dispersal of pollen using pollen traps deployed in different habitats or by collecting pollen present in surface sediments and soils from different environments; see, for example, P. L. Fall, "Spatial patterns of atmospheric pollen dispersal in the Colorado Rocky Mountains, USA," *Review of Palaeobotany and Palynology* 74 (1992) 293-313; C. P. Davies and P. L Fall, "Modern pollen precipitation form an elevational transect in central Jordan and its relationship to vegetation," *Journal of Biogeography* 28 (2001) 1195-1210 and K. H. Orvis, "Modern surface pollen from three transects across the southern Sonoran desert margin, northwestern Mexico," *Palynology* 22 (1998) 197-211. The utility of pollen grains in forensic applications is well established.

Charcoal particles and fragments ranging in size from that of pollen grains to entire tree trunks and branches are produced by the incomplete combustion of organic matter. Microscopic charcoal fragments are often tallied along with pollen grains in studies of pollen records of environmental change to provide an index of tire activity: see, for example, S. P. Horn, "Postglacial vegetation and fire history in the Chirripó páramo of Costa Rica," *Quaternary Research* 40 (1993) 107-116 and M. J. Power et al. (75 total authors including S. Horn), "Changes in fire activity since the last glacial maximum: An assessment based on global synthesis and assessment of charcoal data," *Climate Dynamics* 30 (2008) 887-907. Calibration studies have revealed that the abundance of microscopic charcoal particles correlates with both regional and local fire occurrence. Trace charcoal particles can complement forensic studies of pollen grains, particularly if particular charcoal morphologies can be discriminated and used to identify the type of material burned, by comparison to charcoal reference collections; see, for example, K. H. Orvis, C. S. Lane, and S. P. Horn, "Laboratory production of vouchered reference charcoal from small woody samples and non-woody plant tissues," *Palynology* 29 (2005) 1-11. Samples prepared for analysis of pollen and charcoal may potentially contain distinctive soot carbon particles or carbon spheres derived from fossil fuel burning and may have forensic potential; see, for example. D. T. L. Alexander, P. A. Crozier, and J. R. Anderson, "Brown carbon spheres in east Asian outflow and their optical properties," *Science* 321 (2008) 833-836.

Diatoms are unicellular algae with siliceous valves with intricate ornamentation allowing identification to the species level; see, for example, R. W. Battarbee, V. J. Jones, R. J. Flower, N. G. Cameron, H. Bennion, L, Carvalho, and S. Juggins, "Diatoms" in Tracking Environmental Change Using Lake Sediments, vol. 3, J. P. Smol, H. 3. B. Birks, and W. M. Last (eds.), 155-202. Kluwer Academic Publishers, Dordrecht, The Netherlands, 2001. They are similar in size to pollen grains. Diatoms are found throughout the world in almost all aquatic environments, both freshwater and marine. Studies of diatoms in surface sediments of lakes show strong correlations with physico-chemical factors such as temperature, pH, nutrient levels (particularly N and P), and salinity. Known relationships between diatom assemblages and environmental conditions give diatoms potential utility in forensic and other cases in which materials are to be sourced by environment. In addition to diatoms in modern aquatic environments, windblown materials in drylands of the world may contain diatoms preserved in the sediments of ancient dry lakes. If diatoms in ancient sediments are distinct from those in modern wetlands, they may provide diagnostic information when found on objects of interest.

Foraminifera, or forams for short, are protists which produce tests (shells) that are in most cases composed of calcium carbonate. Characteristics of the tests provide the basis for identification. Forams are primarily found in the marine environment, and are important microfossils in studies of marine sediment cores. They are larger than the other microfossils discussed above—some can be up to 3 mm in size but most are less than 1 mm. Interpretations from foraminifera are based on relationships between species distributions and environmental conditions (for example, benthic or planktonic, and sea surface temperatures), and also on studies of oxygen isotope ratios in foraminifera tests. They have been used in forensic studies in comparing modern marine sediments and rocks; see, for example, Pye, K. *Geological and Soil Evidence: Forensic Applications*. CRC Press, Boca Raton, Fla., 2007.

For all four microfossils of interest, identification is based on comparison of specimens to reference material and published images and descriptions. Pollen, microscopic charcoal, and diatoms are examined on glass slides under high-power magnification. Identification by a human operator requires examining different focal planes ("focusing up and down") to reveal the full, 3D characteristics of the particles. This often requires manipulating the particles to get them to turn over in a liquid mounting medium, to reveal all aspects of their structure and ornamentation. This is done by gently tapping the cover slip with a toothpick or other implement. Specimens mounted in a solid medium cannot be rotated, so only some characteristics may be available for identification purposes. If multiple examples of the same particle are present in the sample, it may be possible to base identifications on features that can be seen in different examples oriented on slides in different ways, though care must be taken that examples truly represent the same microfossil. Other processes may hinder identification. For example, microfossils may be deformed or damaged, either through environmental wear or during sample collection and processing. Human expertise can frequently account for these effects, but they can cause automated methods to fail. Image segment identification methods that are invariant to image deformation, or that can operate upon multiple small segments of the image that are linked by a segment model may overcome these difficulties. For example, the tree of shapes image segmentation models that we have utilized for preferential segment identification may be beneficial. We note, however, that a site may also be identified by the presence of pollen grains from rare plant taxa, or by grains that, even though they are damaged or deformed, have unique and distinctive features. An analogy in the Southern United States is the "dead possum" example—the tail is a unique characteristic by which any Southerner can identify the remains on the road, even if no other morphological characteristics used to identify mammals are visible.

The relationships that exist between microfossil assemblages and geographic and environmental factors provide the basis for using trace microfossils on objects of interest to source objects. For best results, databases must be constructed that capture a wide range of details about the sampling site and its surroundings. Only some of this information may be present in the original literature report. For all of the microfossils of interest, the very local conditions of the study site may only partially explain the modern assemblage. In the case of pollen, it has been shown that different pollen grains will have different source areas, with some types, as mentioned above, potentially dispersing over larger distances. A single pollen assemblage will be influenced by the abundance of plants with poorly dispersed pollen found dose to the sampling site, and by the abundance of plants with well dispersed pollen found at some distance from the site; see, for example, K, D. Bennett, and K. J. Willis, "Pollen" in Tracking Environmental Change Using Lake Sediments, vol. 3, J. P. Smol, H. J. B. Birks, and W. M. Last (eds.). 5-32. Kluwer Academic Publishers, Dordrecht, The Netherlands, 2001. Thus, for understanding pollen assemblages it is important to know not just the local vegetation cover, but vegetation of the surrounding area. For this reason, we expect that it will be advantageous to construct databases that take into account the vegetation matrix viewed at different scales, for example, the vegetation at the sampling site itself and within circular areas of different radii surrounding the study site. Prevailing wind directions may suggest that pollen source areas be modeled using ellipsoidal shapes that are elongated upwind from the sampling site. Prior studies suggest that whether sites are wooded or open has a strong influence on the size of source areas from which they receive pollen input, further complicating the effort that will be required to select, find, and code environmental data appropriate for the interpretation of trace pollen assemblages.

For understanding trace diatom and foraminifera assemblages, important variables may be distance to a paleolake, a marine basin, or exposures of sedimentary rock known to include these microfossils, and may require development of a different system for coding data.

Where sufficient data exist in the literature, one may map microfossil assemblages to reveal spatial patterns that can be useful in sourcing objects of interest, as well as data gaps. "Isopoll" maps similar to those produced in numerous studies in the eastern United States and recently for Argentina might be particularly useful though the data density required may surpass what can be done without a program of sample collection, along with data collection for coding environmental variables; see, for example, P. J. Bartlein, I. C. Prentice, and T. Webb III, "Climate response surfaces from pollen data for some eastern North American taxa," Journal of Biogeography 13 (1986) 35-57 and M. M. Paez, F. Schäbitz, and S. Stutz, "Modern pollen-vegetation and isopoll maps in southern Argentina," Journal of Biogeography 28 (2001) 997-1021.

The interpretation of source area from trace microfossils may include the intersection of results based on different aspects of assemblages. Results could potentially be geographical coordinates, but in other cases may be ecological or environmental characterizations, such as, near a wetland area with local wetland plant species and regional if not local oak forest, and some biomass burning. Because charcoal fragments persist longer in sediments of drylands than pollen grains, they may potentially provide information on ancient as well as modern human impacts, if sediment high in charcoal from prehistoric human activities is mobilized by modern land use activities.

Finer scale geographic and environmental sourcing of objects of interest may include the examination of microbodies including microfossils in large numbers of environmental samples, as well as objects of interest. Automated methods of micro-particle identification, relying on content-based image recognition, may facilitate rapid and extensive environmental and object sampling.

Content-based Image Recognition (CBIR)

Figure 14:
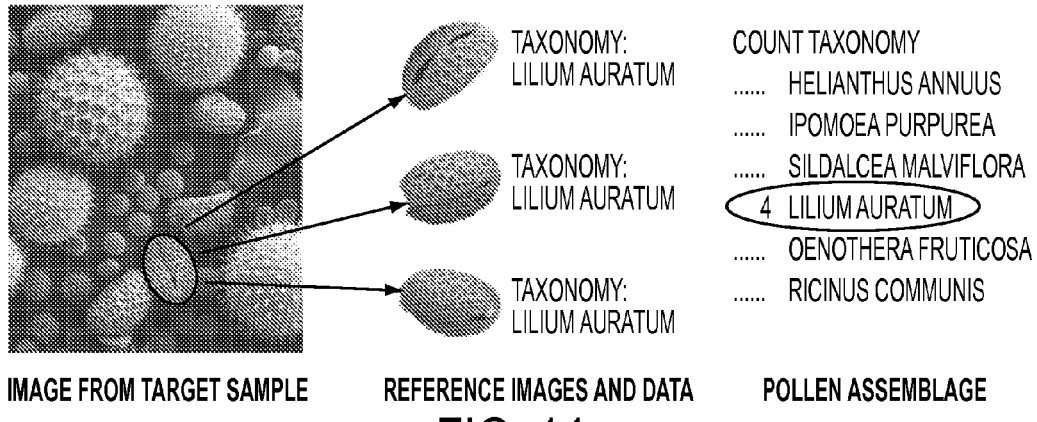
FIG. 14 illustrates automatic recognition of pollen grains using similarity search.

Automated identification of objects such as micro-particles or micro-bodies using image analysis requires isolation of image segments corresponding to each micro-body object and comparison of each segment's data against a reference database to identify stored image segments with similar properties. This process is illustrated in FIG. 14, where an electron micrograph of a collection of pollen grains is first segmented (highlighted grain), followed by extraction of the image segment data to search a reference database for similar images (middle) tagged with metadata, to generate a count of grains of each plant (right), which, once all the counts have been computed, can be use to generate the assemblage vector of percentages by plant taxa; the image is publicly available; see http://commons.wikimedia.org/wiki/File:Misc_pollen.jpg.

The assemblage vector can then be used to search for similar reference assemblages in a database, and metadata (properties) associated with the search results can be utilized in conjunction with a database Model to predict a geographic location, or characteristics of the location, that is likely to be associated with the target sample. This subsection provides an overview of content-based image search and retrieval, and of preferential image segmentation based upon a tree-structured decomposition and representation of an image called the "tree of shapes".

Traditional image search methods are based on keywords. The keywords are chosen in a way that best represents image content, which requires expert knowledge and is labor intensive. An automated content-based image search capability can be more effective and practical when it is feasible. Similarity-based search strategies that find images that are similar to a target using specified similarity criteria are typical of content-based methods. One approach is to embed data objects derived from the images in spaces such as metric spaces and use the distance function or metric as an inverse measure of similarity. Images are represented as points in the metric space, and the image indexing and retrieval method may rely upon properties of the triangle inequality if the distance function is a metric. Performance is a function of several design decisions, such as the selected image preprocessing algorithms, as well as the index structure and the methods used for data retrieval. The purpose of image preprocessing is to extract a vector of desired features from the original images. The research efforts at the University of Tennessee have utilized multivariate statistical analysis based upon PCA to extract feature vectors from images. The feature vectors are embedded in the space, which in this example is a metric space, and are stored in an index structure that is optimized for similarity search. When a search query arrives, similarity search strategies based on the triangle inequality are used to retrieve the images that satisfy the search criterion.

Similarity search based on metric spaces was first introduced in Burkhard, (W. A. Burkhard and R. M. Keller, "Some approaches to best-match file searching," *Comm. ACM*, 16 (4) 1973, 230-236). The triangle inequality was first used for similarity search by Koontz, (W. L. G. Koontz, P. M. Narendra, and K. Fukunaga, "A branch and bound clustering algorithm," *IEEE Trans. Comp.*, C 24, 1975, 908-915). Algorithms based upon this approach can be divided into two categories according to the way in which they partition the metric space. Some partition the space using reference points, while others achieve that based on Voronoi partitions, (F. Aurenhammer, "Voronoi diagrams: a survey of a fundamental geometric data structure," *ACM Comp. Surveys (CSUR)*, 23 (3) 1991, 345-405). This portion of prior research has focused on approaches based on reference points. In these approaches, several points in the metric space are chosen, and the distances between these points and all the remaining points are calculated. The metric space is then partitioned according to these distances. For example, Yianilos implemented vp-tree using this idea; see, for example, P. Yianilos, "Data structures and algorithms for nearest neighbor search in general metric spaces," *Proc. of the 4th Annual ACM-SIAM Symp. On Discrete Algorithms*, Austin, Tex., 311-321, 1993. In the literature, the number of metric computations is typically cited as the criterion of performance. However, this is not a good indicator of performance when preprocessing steps are utilized and the metric is applied to a feature vector. Image preprocessing is a critical component of similarity search strategies that has a significant impact upon overall performance. Search accuracy is also a very important aspect of performance, and must often be judged subjectively using human evaluation. The critical issue is whether searches return results that are useful to the end users, and the choices of metric space and preprocessing steps both influence subjective search accuracy. New performance criteria that consider both search efficiency and utility have been utilized in our prior research to guide the development of CBIR databases; see, for example, Z. Shen, *Database Similarity Search in Metric Spaces: Limitations and Opportunities*. M.S. Thesis, University of Tennessee, August, 2004.

CBIR database design using a metric space approach may be initiated with a choice of preprocessing to extract feature vectors from images, and of the metric space. Let X be an arbitrary set. A function $d:X \times X \rightarrow \Re$ is a metric on X if the following conditions are satisfied for all x,y,z∈X:

Positivity: $d(x,y)>0$ if $x \neq y$, and $d(x,x)=0$
Symmetry: $d(x,y)=d(y,x)$
Triangle inequality: $d(x,z) \leq d(x,y)+d(y,z)$ A metric space is a set with a metric, (X,d). Elements of X are called points of the metric space, and d(x,y) is the distance between points x and y.

Image similarity search approaches based on metric spaces embed all images in a metric space. Similarities between images are evaluated quantitatively by the metric. Similarity searches are modeled by range queries in the metric space, such as: "Find all images within a certain metric value, or distance, from a specified target." Given query (q,r) on a data set in a metric space U, where q is the search target and r is the search range, the goal is to find all objects that are within distance r from the point q in the metric space, or the set $\{u_t \in U | d(q,u_t) \leq r\}$, which is called the result set of query (q,r).

Search methods based on metric spaces can use tree-structured indexing techniques to achieve a sub-linear time complexity. At each tree node, indexing divides the data set into several subsets based on similarity relations between objects. Indexing based on a metric space is equivalent to hierarchically partitioning the space into several subsets. Different partition strategies yield different search performance. All the existing partition strategies can be divided into two categories: methods using reference points, and methods based on Voronoi partitions. The prior work at the University of Tennessee focused on approaches based on reference points. Partitioning approaches using reference points choose several reference points in the space and assign one or more of them to each node of an indexing tree. The set of images associated with a node is divided into several subsets according to the distances between the images and the reference points. Child nodes repeat this process with other reference points until leaves in the index tree are reached. In this manner, the space of images is hierarchically partitioned into portions of annular regions.

Given the desired tree height h, h reference points $\{p_1, p_2, \ldots, p_n\}$ are chosen. A reference point $p_i$ is assigned to the nodes at level i of the tree. At level i, the space is partitioned into several non-intersecting annular regions $R_{ij}$, $j=1,n_i$ centered at the reference point $p_i$, defined by a sequence of increasing diameters. Given the set of data points U embedded in the metric space, the annular regions associated with reference point $p_i$ are $$R_{ij} = \{u_k \in U | d(u_k, p_i) \in [a_{ij}, a_{ij+1}]\}$$

where $\{a_{ij}\}_{j=1}^{n_i+1}$ an increasing sequence with $a_{i1}=0$ and $a_{in_i+1}=\infty$. The indexing tree can be visualized as h levels of annular regions that overlap. The final partition consists of the intersections of all the annular regions.

Figures 15A, 15B:
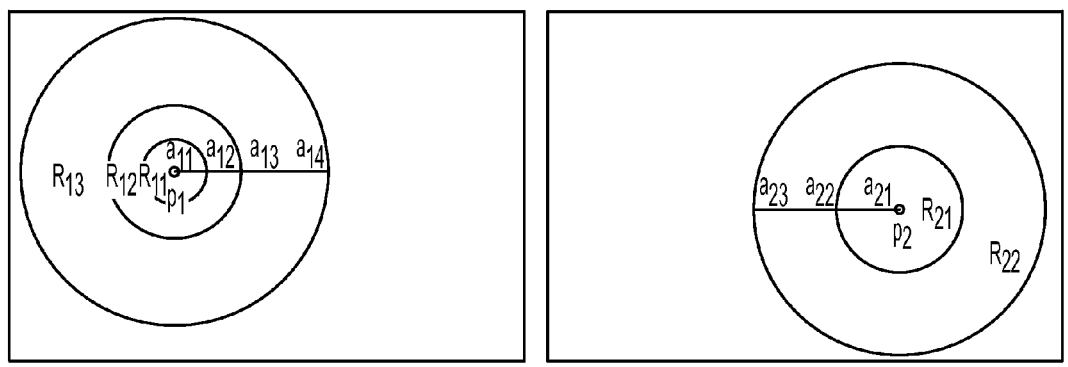
FIG. 15A shows a partition at level 1.
FIG. 15B shows a partition at level 2.
Figure 15:
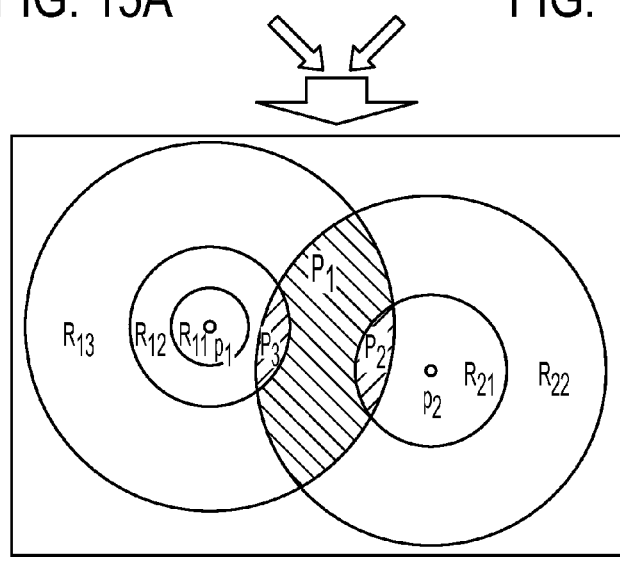

FIG. 15 illustrates an example of the partition of a 2-level indexing tree. In (A), the space at tree level 1 is partitioned into three annular regions $R_{11}$, $R_{12}$, and $R_{13}$ (with a fourth region implicitly extending from the largest boundary shown in the figure to infinity, which is generally empty). At tree level 2 in (B), the space is partitioned into two annular regions $R_{21}$ and $R_{22}$. The final partition (C) of the 2-level indexing tree is produced by the intersections of these five annular regions. There are eight subsets in the final partition (C) (not including the implicit regions that extend to infinity).

Figure 16:
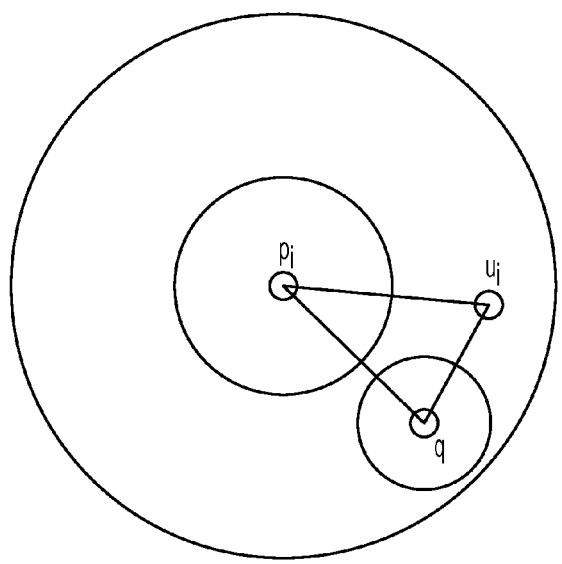
FIG. 16 shows a triangle inequality.

Image similarity search methods that use indices based upon reference points may use the triangle inequality to rule out partitions, and therefore paths of descent in the index tree, that can not contain a solution. The search request propagates through the tree-structured index, and a candidate set is generated. A result set, which is a subset of the candidate set, is obtained by exhaustively searching the candidate set. The candidate set of query (q,r) is found using the triangle inequality. In FIG. 16, three points, a reference point $p_j$, the query target q, and an object $u_i$ are located in the metric space, demonstrating the triangle inequality in similarity search. The triangle inequality relates the values of the metrics, or distances, as represented in the figure by lines, by the inequalities:

$$d(q, u_i) \leq d(u_i, p_j) + d(q, p_j)$$

and $$d(q, p_j) \leq d(u_i, p_j) + d(q, u_i) \Rightarrow d(q, p_j) - d(u_i, p_j) \leq d(q, u_i),$$

or $$d(q, p_j) - d(u_i, p_j) \leq d(q, u_i) \leq d(q, p_j) + d(u_i, p_j).$$

If $u_i$ belongs to the result set, it should satisfy the search criterion $$d(q,u_i) \leq r,$$

or $$d(q,p_j) - r \leq d(u_i,p_j) \leq d(q,p_j) + r.$$

Therefore, a necessary condition SC that must hold in order for the search criterion to be satisfied by $u_i$ is, $$SC = \bigcap_{j=1}^{k} \{u_i \in U \mid d(u_i, p_j) \in [d(q, p_j) - r, d(q, p_j) + r]\}$$

The candidate set Cand is the union of all the stored objects lying within partitions that intersect the search criterion SC, $$Cand = \bigcup_{i=1}^{t} \{P_i \mid P_i \cap SC \neq \emptyset\}$$

where t is the total number of partitions. Once the search request has been restricted to the candidate set, the candidate set is scanned exhaustively to get the result set, $$Res = \{u_i \in U \mid u_i \in Cand \wedge d(u_i,q) \leq r\}$$

Figure 17A:
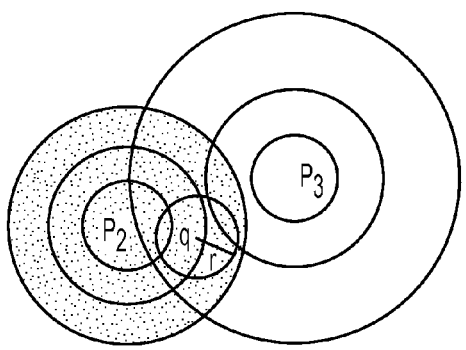
FIG. 17A shows a reference points $P_2$ and $P_3$.
Figure 17B:
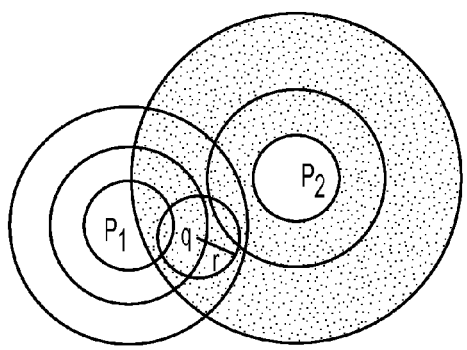
FIG. 17B shows reference points $P_1$ and $P_2$.
Figure 17C:
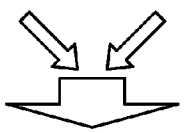
FIG. 17C shows reference points $P_1$ and $P_2$ from FIGS. 17A and 17B.
Figure 17C:
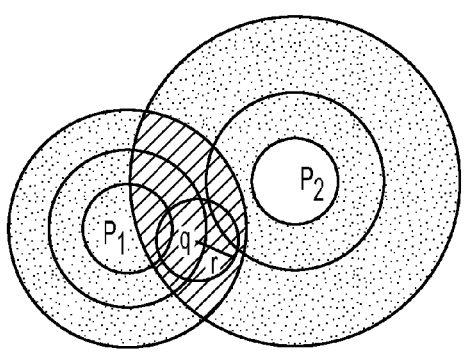

FIG. 17A, FIG. 17B, and FIG. 17C illustrates an example of processing a search query (q,r) on a two level index tree based upon reference points $P_1$, $P_2$, $P_3$. In FIG. 17A, three subsets intersect with the search criterion, and in FIG. 17B two subsets intersect with the search criterion. The shaded area in FIG. 17C, which is the intersection of the two shaded areas in FIG. 17A and FIG. 17B, represents the candidate set.

One component of the search time is typically proportional to the size of the candidate set, due to linear search. A second component is due to traversal of the tree, and is typically logarithmic in the size of the database, and a third component is due to computation of the metric distance from the query to each reference point. This is summarized by the equation $$T + N_{ref} \times T_{metric} + N_{cand} \times T_{metric} + T_{tree} = (N_{ref} + N_{cand}) \times T_{metric} + T_{tree}$$

where $N_{ref}$ the number of reference points, $N_{cand}$ is the number of objects in the candidate set, and $T_{tree}$ is the tree traversal time. Let $N_{metric} = N_{ref} + N_{cand}$, which is the total number of metric evaluations. Since metric computations are usually more time consuming than the time required to traverse the index tree, $T_{tree}$ can be neglected. In most situations, $N_{cand} > N_{ref}$ by a wide margin, so the size of candidate set is the dominant component and the search time is primarily determined by $N_{cand}$.

Figure 18:
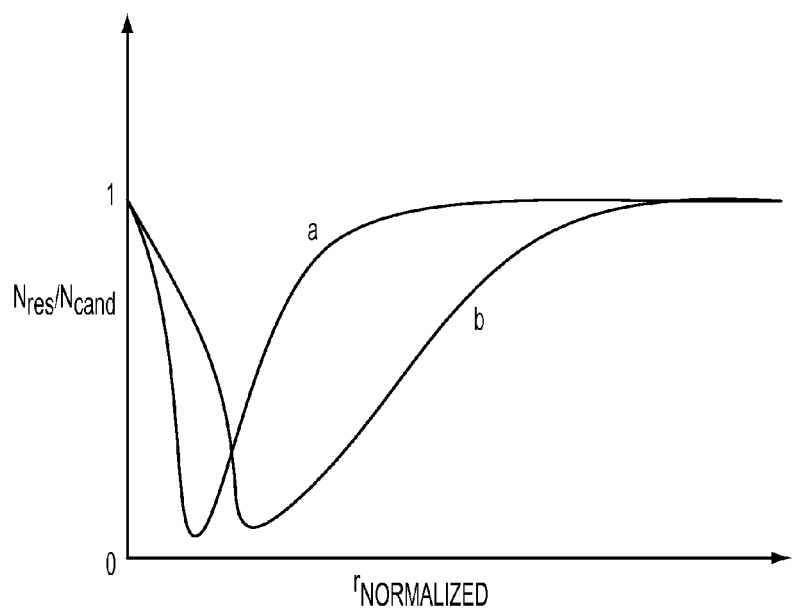
FIG. 18 shows a performance comparison of two data extraction methods.

The design of a CBIR database is typically an iterative process, with trade-off studies performed on a sample of representative images to determine the optimal preprocessing strategy and embedding in a metric space. This process needs to be guided by quantitative evaluations of the performance of candidate designs. Usually, the number of metric computations determined by the candidate set size is used as the criterion to evaluate search performance. However, this criterion only works for comparing different search methods that produce the same result set. In other words, the comparison of $N_{metric}$ is feasible when the search results are the same. Different image preprocessing methods, index structures and retrieval strategies will yield different result sets. Therefore, a new criterion that considers both the candidate set size and result set size is required. The ratio between $N_{res}$, the number of results of a search, and $N_{cand}$ has been chosen to meet this requirement. A high quality search strategy should yield a large value for the ratio $N_{res}/N_{cand}$. In other words, $N_{res}$ should be close to $N_{cand}$, which means few unnecessary metric computations are performed during the search. The value of $N_{res}/N_{cand}$ also measures the efficiency of a search strategy. In order to compare the performance across different data sets, normalized search ranges are used. A normalized search range is the ratio between the search range and the average distance between all the stored objects, or $r/\mu$, where the average distance $\mu$ is $$\mu = \frac{\sum_{i=1}^{N_{total}} \sum_{j=i+1}^{N_{total}} d(u_i, u_j)}{N_{total} \times (N_{total} - 1)/2}$$

where $N_{total}$ is the total number of objects stored in the database. A figure that illustrates the values of $N_{res}/N_{cand}$ against different $r_{normalized}$ is used to evaluate the performance of different metrics and data extraction methods. In such a figure, the area under the curve of $N_{res}/N_{cand}$ indicates the performance, and a larger area means a better performance with respect to search efficiency. FIG. 18 is an example figure comparing performance of two different data extraction methods a and b.

The area under curve a is larger than that under curve b. Thus, the search performance of using data extraction method a is better than that using b. In order to make this criterion more suitable for practical applications, an improved performance evaluation method is provided. Assume the search ranges are distributed exponentially.

$$p(r_{normalized}) = \gamma e^{-\gamma r_{normalized}}$$

for a positive constant $\gamma$. The search performance for search ranges smaller than $r_{max}$ can be evaluated by a weighted integration.

$$\phi(r_{max}) = \int_0^{r_{max}} \frac{N_{res}(\hat{r})}{N_{cand}(\hat{r})} \gamma e^{-\gamma \hat{r}} d\hat{r}$$

The performance characteristic measured by $\phi(r_{max})$ is expected search efficiency over exponentially distributed search ranges less than $r_{max}$. The value of $r_{max}$ is assumed to be sufficiently large that the contribution by the tail of the distribution can be neglected.

The numeric value of $\phi(r_{max})$ provides a method of comparing search efficiency across candidate database designs. Another critical measure of performance, which tends to be highly subjective, is the utility of search results. In other words, does the search method return results that are useful to users? A method that we have utilized in a prior design for a database of 1,092 photos of rowing teams is used as an illustration. The photos in this data set belong to various types, including photos looking down on a boat with rowers, photos of boats in a race at different locations and events, taken from the side, and photos of a rowing team in groups. For the evaluation of database utility, all the photos were divided into 8 types, and 3 photos were chosen from each type. These selected photos were used as search targets, defining 24 searches. Four example photos belonging to different types are presented in FIG. 5. The search results were judged manually by one of the investigators, and a score was assigned to the quality of the returned results for each search. The scores for search efficiency and search utility were utilized to compare among a selection of image preprocessing steps utilizing PCA methods to extract feature vectors, and different metric space embeddings, enabling the implementation of a database that provided both acceptable utility and high performance.

A CBIR database may be used to store raw images, but it is likely to be more effective in the identification of micro-bodies or micro-particles if the images are first segmented. An ideal segmentation would create images containing, for example, individual pollen grains or diatoms with no background or obscuring data. This can be done manually, but partial or total automation of the image segmentation step may use a preferential image segmentation algorithm based upon "tree of shapes" descriptions of the image and image segments, as described in detail in Y. Pan, *Image Segmentation casing PDE, Variational, Morphological and Probabilistic Methods*, PhD Dissertation, Electrical Engineering. University of Tennessee, December, 2007, incorporated by reference in its entirety. This representation provides a hierarchical tree for the objects contained in the level sets of the image. The hierarchical structure is utilized to select the candidate objects from the image. The boundaries of the selected objects are then compared with those of objects selected from prior images. By means of the tree of shapes and curve matching, the proposed method is able to preferentially segment objects with closed boundaries from complicated images. It is more straightforward to utilize prior information in this way than with curve evolution methods, and there is no initialization problem. Furthermore, the method is invariant to contrast change and translation, rotation and scale. The method has been shown to work in the presence of noise.

The preferential image segmentation algorithm is illustrated by example. An intuitive description of the algorithm is to construct the trees of shapes for both a target and a candidate image that are to be compared. The candidate image would correspond to a reference image of a pollen grain in a database, while the target image would correspond to a sample to be analyzed. Both images are segmented into a tree of shapes description, which is a nested collection of upper (or lower) level sets; see, for example, L. Ambrosio, V. Caselles, S. Masnou, and J. M. Morel, "Connected components of sets of finite perimeter and applications to image processing," *Journal of the European Mathematical Society*, 3(1)213-266, 2001. The objective is to find a node within the tree of shapes description of the candidate image that is the root of a sub-tree that matches the tree representation of the target (reference) image to within a specified accuracy.

Figure 19A:
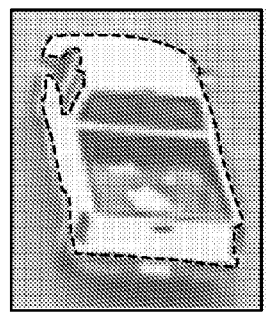
FIG. 19A shows a truck image from FIG. 19C
Figure 19B:
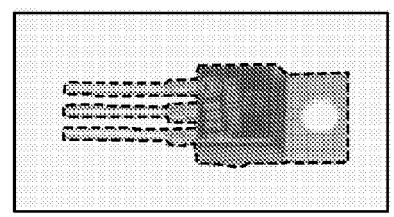
FIG. 19B shows an electronic component taken from FIG. 19D.
Figure 19C:
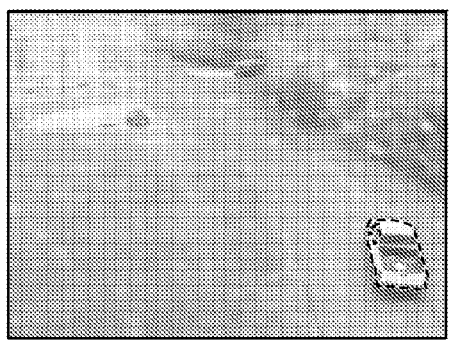
Figure 19D:
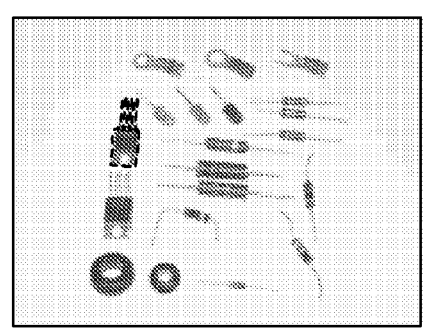

FIG. 19A, FIG. 19B, FIG. 19C and FIG. 19D show two examples of preferential segmentation which are shown here to illustrate the performance of the method; see Pan for a more extensive evaluation where FIG. 19A represents the target image of a truck segmented in a candidate video frame FIG. 19C and FIG. 19B is a target image of an electronic component segmented in image FIG. 19D. Image FIG. 19C is a surveillance video frame that was segmented to find a match to target image FIG. 19A. The only matching segment that was returned was the segment containing the image of the truck FIG. 19A, outlined in red (heavy line). Image FIG. 19D is a photograph of a collection of electronic parts. Image FIG. 19B is a photograph of one of these parts taken with a different orientation. The preferential image segmentation algorithm segmented the correct part, outlined in red (third component from left bottom) in image FIG. 19D, demonstrating the algorithm's tolerance of rotation and scaling.

In one embodiment, preferential image segmentation may be utilized to isolate images of individual micro-bodies for identification. Feature vectors are extracted from each isolated image and utilized to query a database of reference images and associated metadata in order to select the most similar reference data to each particle from the database and identify the charcoal particle, pollen grain, diatom, foraminifera, or other particle. Micro-hod) assemblage data can be constructed for each sample from these identifications, substantially reducing the human labor necessary to process samples.

Images obtained using optical microscopy have an extremely shallow depth of field relative to the diameter of, for example, a pollen grain. Microfossils have three dimensional structure, and any projection of this structure into a two dimensional image represents a loss of information. The limitations of the shallow depth of field can be reduced using a sequence of images as the focal plane is moved, and both confocal and scanning electron microscopy SEM provide greater depth of field, with SEM microscopy having a significant advantage over standard optical techniques when surface texture is used as a discriminating feature. A 3D representation of a microfossil can be constructed from multiple 2D images taking at various orientations, but requires additional reference data. Past automated identification efforts have relied upon image analysis algorithms that are specific to shape or textural features, or artificial neural networks (ANN). Of the ANN approaches, France et al. (1. France, A. W. G. Duller and G. A. T. Duller, *Software Aspects of Automated Recognition of Particles; the Example of Pollen, Image Analysis, Sediments and Paleoenvironments*, P. Frances (ed.), Kluwer (2004) 253-272) appear the most promising. France et al. utilize a 3-layer network, using Gabor filters to detect edges, followed by a layer to piece edges together into an object and a final layer for identification. During training, their approach adds new objects that cannot be classified to the set of classes, allowing the algorithm to adapt to newly presented data (if done in training).

CBIR using similarity search is applied in one embodiment for micro-particle recognition, allowing Model-based prediction of a particle's taxon using the most similar reference data available. This approach provides a natural growth path as new data are added to the reference collection, obviating the need for new algorithms or retraining of classifiers. The objective is classification of each micro-particle and subsequent calculation of one or more micro-body assemblages for each sample, using a system and methodology that can grow with the reference collection, producing better predictions with greater accuracy over time. Once a micro-particle assemblage has been obtained from a sample, the micro-body assemblage database (MAD) constructed of data for the micro-particle assemblages can be queried to determine similar micro-body assemblages within the reference database. These reference data can be utilized in conjunction with models to predict geographic location or other characteristics of the object or of the local environment.

Measured properties of spectral/acoustic data, micro-body assemblages and images of objects can be utilized, in conjunction with respective databases that support search and retrieval based upon similarities among objects, to provide information about geographic location and other properties of a sampled target object. ESD and MAD are examples of databases that can build upon existing technologies that have been developed to implement high-performance similarity search engines.

Thus, there is provided an automated analysis and identification of micro-particles, larger objects and the like which may be found in trace quantities of or even be the target object. Content-based image retrieval (CBIR), and associated databases which may contain photographs, X-rays, MRI image data, infrared image data and the like, is a relatively new technology that has undergone rapid evolution over the past decade. The literature on automated microfossil identification focuses primarily on two approaches: structural/statistical techniques, and methods based upon neural network classifiers. The first approach requires image analysis algorithms tailored to resolve specific features, while neural network methods have difficulty extending as the reference data expand, without lengthy retraining. CBIR, combined with preferential image segmentation, will be effective in reducing the burden placed upon the classification step by focusing the classifier's scope to the set of reference data and features (for example, apertures and sculpturing on pollen grains) most similar to a target sample's image(s) and most likely to lead to accurate identification.

Figure 20:
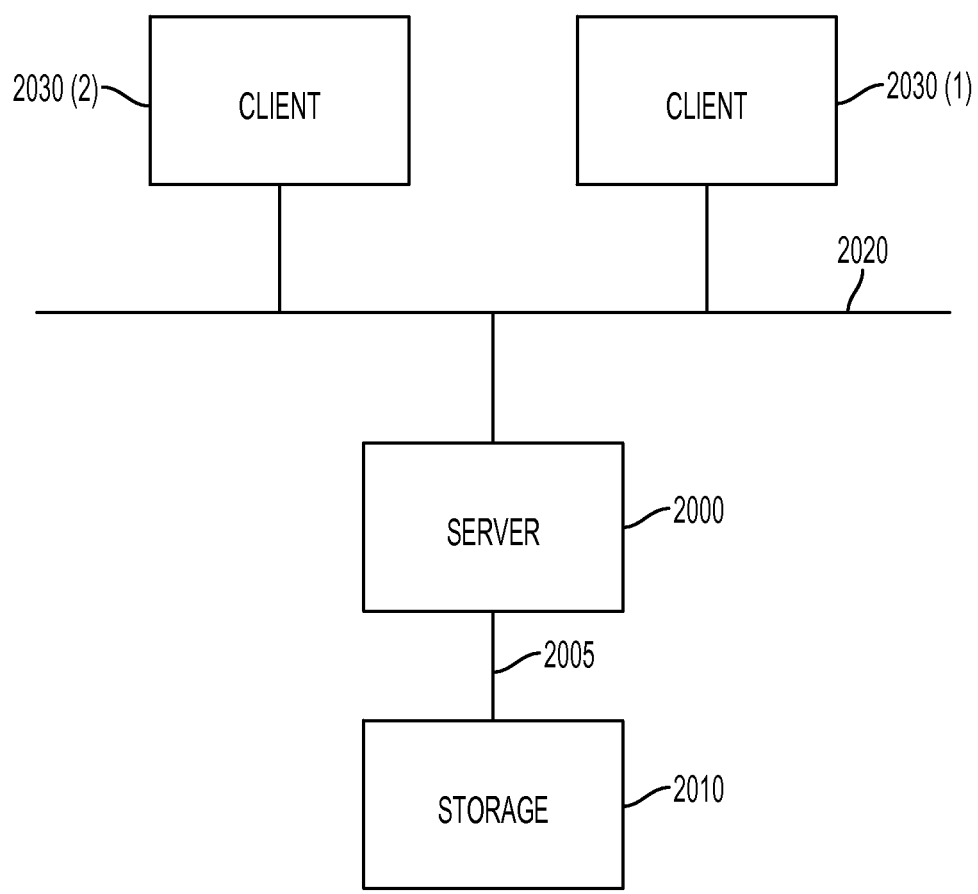
FIG. 20 shows a block diagram of a data modeler platform.

Referring to FIG. 20, there is shown a data modeler platform in accordance with one embodiment. In accordance with FIG. 20, client 2030, server 2000 and storage 2010 can be combined as a single unit (e.g., a computer or laptop), or separate units (multiple computers that communicate using, for example, a network). Each unit is able to communicate with either a user (using, for example, a keyboard, mouse, and display, not shown) or a computer or device (using, for example, a wired network 2020 such as Ethernet or a wireless communications infrastructure such as IEEE 802.11 or a packet data network 2020 such as 3G cellular or PCS), which can optionally provide an interface to a user.

The server 2000 may be implemented using several networked servers with different functions allocated to each server. For example, a server 2000 might be utilized for each database index. A separate server, or multiple servers, not shown, might also be utilized to process transactions and communications with clients 2030(1) and 2030(2). One or more servers 2000 might be utilized to control specialized data or image acquisition equipment such as microscopes, cameras, and scanners. Alternatively, some or all of these servers might be implemented as virtual servers in one or more physical servers using software such as Xen (http://www.xen.org/), VMware ESXi (http://www.vmware.com/), or Sun xVM Ops Center (http://www.sun.com/software/products/xvmopscenter/index.jsp).

As another alternative, the server 2000 could utilize a computer with multiple processors and/or multiple cores having either a symmetric multi-processing (SMP) or non-uniform memory access (NUMA) architecture. Storage 2010 can be contained within the server, or separate, as would be the case, for example, when a network-attached storage (NAS) device or storage appliance was used. Redundant storage systems may be utilized; example technologies include RAID and Sun ZFS, and may include redundant hardware, power, and network pathways. The server 2000 may, by way of example, be a Sun Fire X2200 M2 x64 Server containing two quad-core AMD model 2376 processors, 32 GB of memory, two 146 GB SAS hard disk drives, and a DVD-ROM. The bus system 2005 may include a Sun StorageTek™ 8-port external SAS PCI-Express host Bus Adapter that is housed with the server 2000 as an interface to an external storage array 2010. The external storage array 2010 may be a Sun Storage J4200 array with 6 TB of storage. The work station systems include, for example, six Sun Ultra 24 Workstations with 22" LCD monitors, which can be used as clients 2030 to the server 2000. Racking for the system may include an equipment rack with a power distribution unit and an uninterruptible power supply. A network switch for network 2020 is not shown but may be implied from their common utility in, for example, a local area network, a wide area local network or any telecommunications network known in the art. A typical network switch for the system of FIG. 20 may be the Netgear JGS524 Prosafe 24-Port Gigabit Ethernet Switch, with compatible (CAT-5e or CAT-6) cabling. If one were to use network attached storage (NAS) such as iSCSI or a network storage device such as the Sun 7200 Unified Storage System, a second network switch might be utilized to separate data traffic between the storage system 2010 and the server 2000 from data traffic between the server 2000 and other computers or clients 2030.

Figure 21:
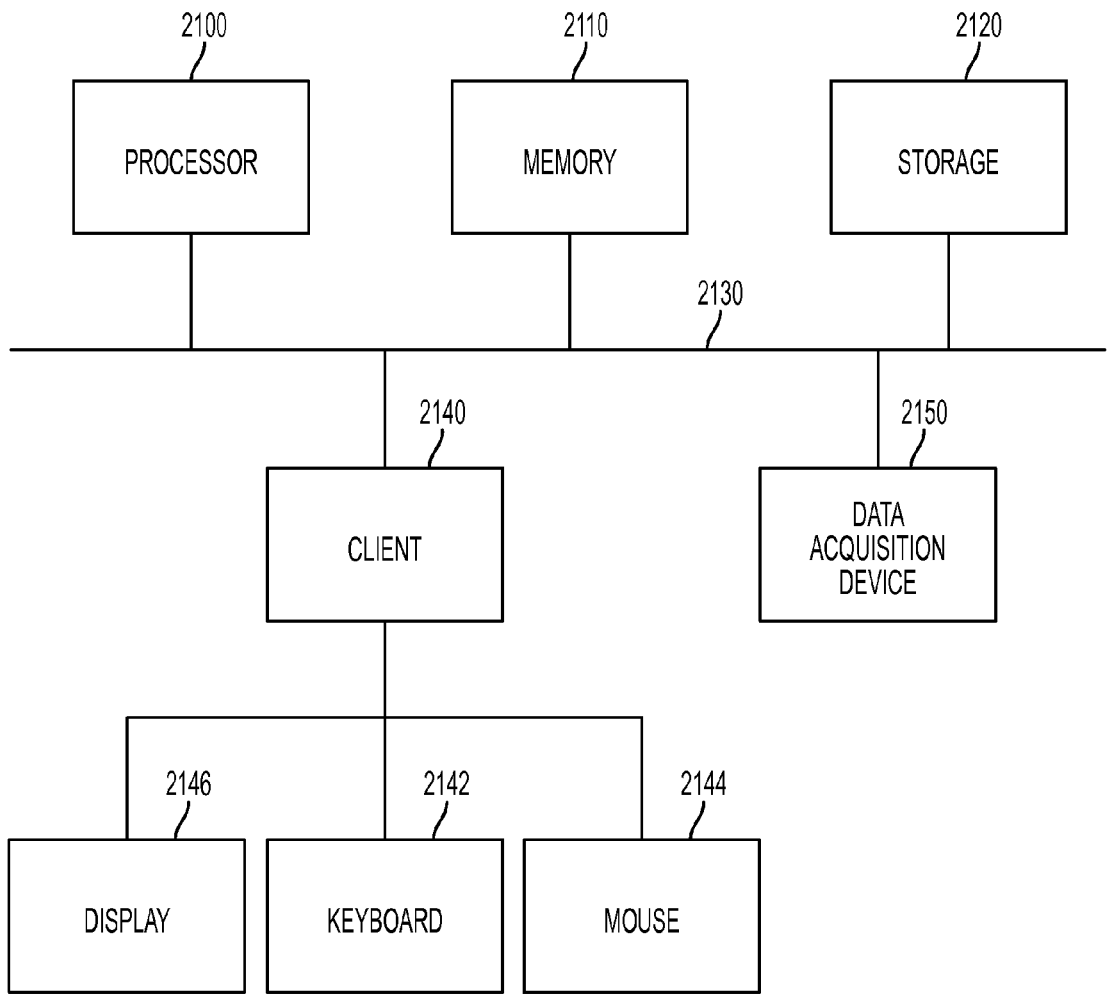
FIG. 21 shows a block diagram of exemplary system components.
Figure 22:
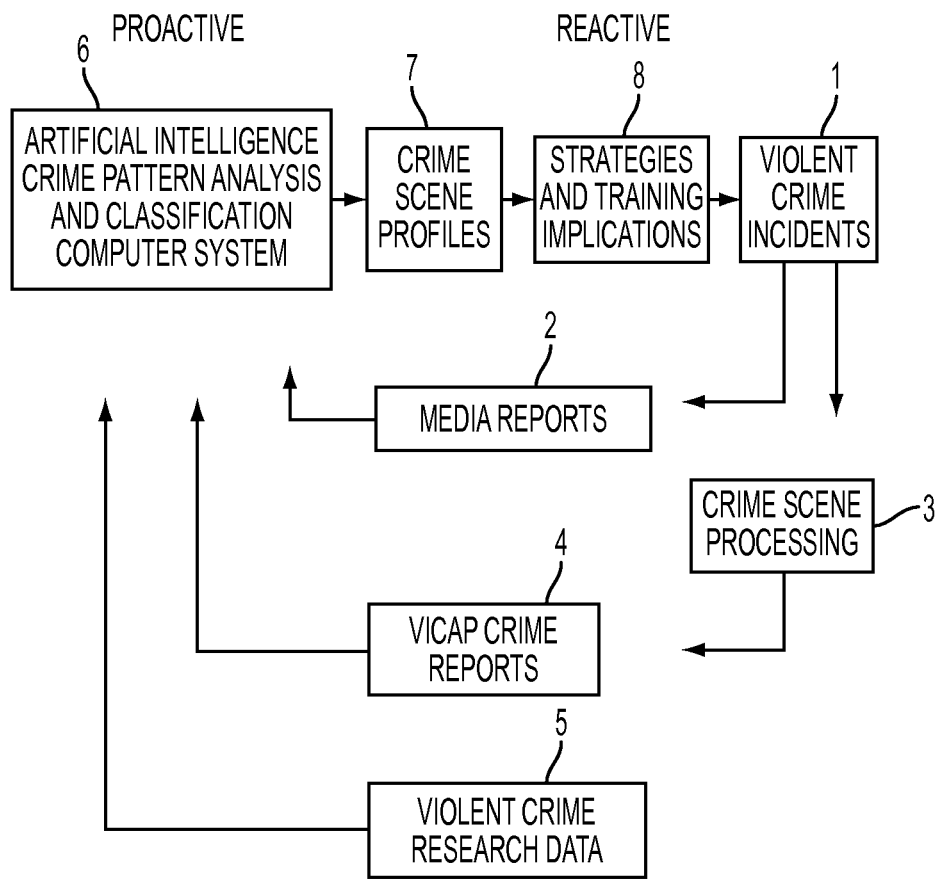
FIG. 22 is a prior art block diagram of an automated crime profiling system.
Figure 23:
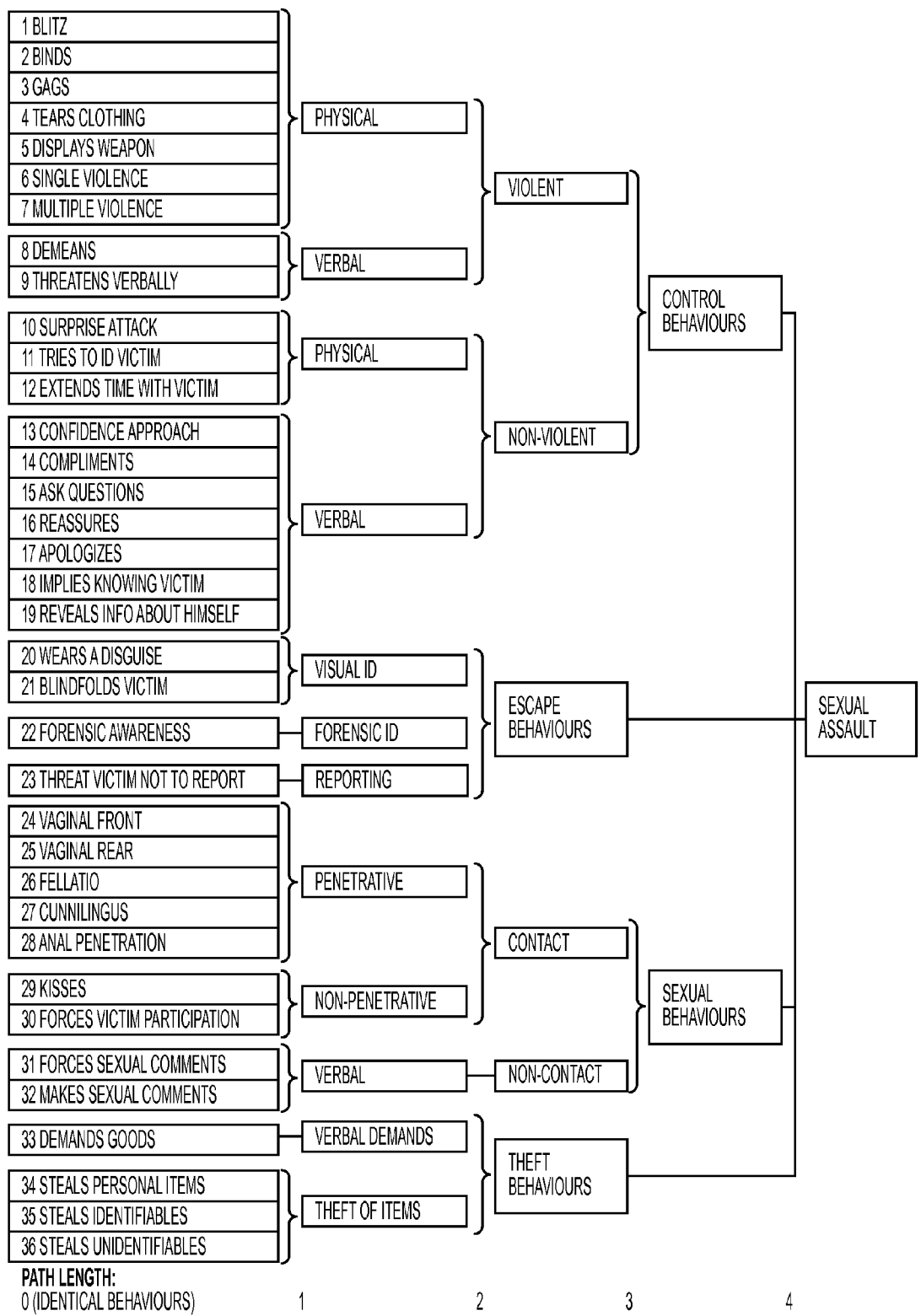
FIG. 23 is a prior art behavioral hierarchy at four levels and comprising thirty-six attributes for a sexual assault crime.

System components will now be discussed with reference to FIG. 21. Referring to FIG. 21, the system supporting databases and prediction of properties of objects has at least one processor 2100, but may have more than one processor, and the processor may implement more than one processor core. The processor has access to memory 2110, which is used to store index structures that enable rapid access to stored objects that have similarities to the attributes of a target object specified in a query. Storage 2120 is utilized to provide persistent memory and to serve as a repository for information that does not need to be accessed as efficiently (rapidly) as the in-memory objects. For example, images may reside in storage 2120 while descriptions of the shapes of segments of these images or other attributes of the images may reside in memory 2110. One or more clients 2140 can submit queries to the server's software, which are interpreted by the processor 2100 in order to perform searches using the index structures that are resident in memory 2110 and, possibly, the data contained in the storage 2120. Results are returned by the processor 2100 to the clients 2140 via network 2130. Users can interact with the system through the client(s) 2140 using input devices such as a keyboard 2142 and mouse 2144 and output devices such as a display 2146. All of the components may be implemented in a single computer system such as a laptop, desktop, or server, or they may be implemented in separate computers that interact using a communications medium such as a wired or wireless network 2130.

A data acquisition device 2150 may be connected to either a client 2140 or a server 2100, 2110, 2120 using an interface such as a serial interface, Ethernet, a data acquisition and control card, a universal serial bus (USB), or a FireWire bus or network 2130. Example data acquisition devices include scanners, microscopes (optical, electron, or confocal), cameras (still image or video), antennas, infrared sensors, acoustic sensors, laser rangefinders or scanners, passive microwave sensors and spectroscopic instrumentation or related field portable devices. The interface 2130 to the data acquisition device 2150 may be bi-directional, meaning that the server or client can control the operation of the data acquisition device 2150 to, for example, locate and examine portions of a specimen that is subject to analysis. The data acquisition device 2150 may utilize a wireless, wired, acoustic, or optical communications link to control a remote device and/or acquire information from a remote device.

All United States and foreign patents and articles whose citations are provided above should be deemed to be incorporated by reference as to their entire contents for the purposes of understanding the underlying technology behind an embodiment of a method and apparatus for predicting object properties using similarity-based information retrieval and modeling. The embodiments of a method and apparatus for predicting properties using similarity-based information retrieval and modeling described above should only be deemed to be limited by the scope of the claims which follow.

What we claim is:

1. A method of detecting a pattern of one of a fraudulent activity and a criminal activity by recording an object in a transaction database, the object comprising at least two suspicious transactions in a transaction database, the transaction database being coupled to processor search manager apparatus, the processor search manager apparatus comprising a processor and memory, the memory coupled to the transaction database, the method comprising:

testing by said processor of hypotheses representing a possible organizational structure of the criminal or fraudulent activity comprising at least one offender, said transaction database comprising one of a similarity-based and a nearest neighbor search; and applying at least one model to results returned from the transaction database in response to a query, the query requesting objects comprising suspicious transaction data in said transaction database most similar to a target object comprising data of a transaction, the queried transaction objects, responsive to the query, being most similar to each other, and applying multivariate statistical analysis and clustering to determine tree-structured index for indexing and searching the transaction database to retrieve the objects most similar to the target objects;

the testing including testing at least one hypothesis of a possible organizational structure and detecting the pattern of one of the fraudulent activity and the criminal activity; the pattern detection comprising a prediction of attributes including two of gender, marital status, occupation and age of an offender of the suspicious transaction and member of the criminal or fraudulent organizational structure.

2. The method of claim 1, the transaction database comprising purchasing patterns of a plurality of different consumers, the method further comprising applying the model to consumer members of a cluster of similar consumer behavior to obtain a relationship comprising a flow of one of capital, goods and services between consumer members of the cluster and an enterprise.

3. The method of claim 1, an organizational structure hypothesis comprising interactions among a plurality of communication devices forming nodes of a communications network between an offender and an enterprise.

4. The method of claim 1 wherein the transaction comprises a medical record of medical data of a medical claim of a consumer of medical services to detect a pattern of fraudulent activity of the consumer and the suspicious transaction data comprises an insurance fraudulent activity.

5. The method of claim 1, the transaction data comprising at least two suspicious financial transactions, the transaction database comprising a financial transaction database, the method comprising predicting an instance of medical insurance fraud by one of a consumer offender and an insurance enterprise offender responsive to a query of the financial transaction database.

6. The method of claim 1, the transaction data comprising at least two suspicious financial transactions of a financial transaction database, wherein the pattern comprises equities that move as a group in a first transaction or move as a plurality of financial transactions delayed in time with respect to one another.

7. The method of claim 1 further comprising mining transaction information stored in the transaction database to identify a cluster representing a similar behavior including a suspicious financial transaction pattern of one of a consumer offender and an enterprise offender.

8. The method of claim 1, the model comprising one of a Bayesian model and a belief network, the model comprising a graph of hypothetical relationships between the objects comprising suspicious transaction data responsive to the query.

9. The method of claim 1 further comprising performing a search of the transaction database against itself to determine a list of most similar clusters of one of fraudulent and criminal activities.

10. The method of claim 9 further comprising adding data to the transaction database comprising one of metadata of the most similar clusters and identification of the list of most similar clusters, the metadata comprising date, time and location data of the activities.

11. The method of claim 1 further comprising predicting one of an individual offender and an entity comprising a plurality of individual offenders engaged in an illicit enterprise.

12. The method of claim 1 further comprising predicting one of a type of material used to accelerate a fire and a type of carried weapon in combination with predicting offender attributes.

13. The method of claim 1, the hypotheses representing a possible organizational structure comprising first and second hypothesis comprising first and second likelihoods of an individual offender and of a plurality of individual offenders, the set of first and second likelihoods comprising a likelihood ratio.

14. The method of claim 1 further comprising predicting a property responsive to the query of the transaction database, the predicted property being one of a likelihood, a probability and a belief that the target object and retrieved objects of transaction data responsive to the query satisfy a postulated relationship across alternative hypotheses of organizational structure.

15. The method of claim 14, the predicted property being a likelihood of one of an individual offender and of a plurality of individual offenders, the method further comprising expressing the alternative hypotheses of organizational structure as a likelihood ratio.

16. The method of claim 1, the nearest neighbor search comprising a similarity measure and a search by said similarity measure of the transaction database, the transaction database comprising a plurality of different transactions.

17. The method of claim 1, the possible organizational structure of a criminal conspiracy comprising at least two different criminal offenders.

18. The method of claim 1, a suspicious criminal activity being arson and the fraudulent activity comprising insurance fraud, further comprising clustering of the data of the transaction database to recognize clustering of fire combustion products, offender data indicating ownership of a fire insurance policy and a man-made fire.

19. The method of claim 1 further comprising a plurality of databases, the plurality of databases including the transaction database, a spectral property database comprising electromagnetic and acoustic data, a micro-body assemblage database comprising charcoal and fossil data and an image database, the method further comprising predicting one of a source, an origin and a location of one of an object comprising suspicious transaction data responsive to the query with reference to the transaction database, the spectral property database, the micro-body assemblage database or the image database.

20. The method of claim 1 wherein the plurality of databases transaction data indexed by frequency.

21. The method of claim 20 wherein the transaction data indexed by frequency comprises time-of-day, day-of-week and approximate instance of one of a new moon and a full moon.

22. A method of detecting a pattern of a fraudulent activity by recording an object in a transaction database comprising insurance data, the object comprising at least one suspicious transaction in an insurance transaction database, the insurance transaction database being coupled to processor search manager apparatus, the processor search manager apparatus comprising a processor and memory, the memory coupled to the insurance transaction database, the method comprising:
  testing by said processor of hypotheses representing possible organizational structures of insurance fraudulent activity, said transaction database comprising one of a similarity-based and a nearest neighbor search; and
  applying at least one model to results returned from the database in response to a query, the query requesting insurance data objects in said insurance transaction database most similar to a target object comprising insurance data, the queried objects, responsive to the query, being most similar to each other, and
  applying multivariate statistical analysis and clustering to determine a tree-structured index for indexing and searching the transaction database to retrieve the objects most similar to the target objects;
  the testing including testing at least one hypothesis that the target object comprises a fraudulent insurance claim and detecting the pattern of fraudulent activity.

23. The method of claim 22, the insurance transaction database comprising insurance purchasing patterns of a plurality of consumers, the method further comprising applying the model to consumer members of a cluster of similar consumer behavior to obtain a relationship comprising a flow of one of capital, property and services between or among consumer members of the cluster of similar consumer behavior and the insurance enterprise.

24. The method of claim 22 an organizational structure hypothesis comprising interactions among a plurality of communication devices forming nodes of a communications network between or among consumers and at least one insurance enterprise.

25. The method of claim 22 wherein the insurance transaction comprises a medical record of medical data of a medical claim of a consumer of medical services to detect a pattern of fraudulent activity of one of a consumer and an insurance enterprise.

26. The method of claim 22, the insurance transaction database comprising a medical transaction database, the method comprising predicting an instance of medical insurance fraud by one of a consumer and an insurance enterprise responsive to a query of the insurance transaction database.

27. The method of claim 22 wherein the pattern comprises one of equities and money that move as a group in a first transaction or the one of equities and money move as a plurality of transactions delayed in time with respect to one another and the possible organizational structure of insurance fraudulent activity.

28. The method of claim 22 further comprising mining transaction information stored in the transaction database to identify a cluster representing a similar behavior including a purchasing pattern of one of a consumer and an insurance enterprise.

29. The method of claim 22, the model comprising one of a Bayesian model and a belief network, the model comprising a graph of hypothetical relationships between insurance data objects responsive to the query.

30. A method of detecting a pattern of a criminal activity by recording an object in a criminal transaction database to predict a criminal profile, the object comprising at least one suspicious criminal transaction in the criminal transaction database, the criminal transaction database being coupled to processor search manager apparatus, the processor search manager apparatus comprising a processor and memory, the memory coupled to the criminal transaction database, the method comprising:
  testing by said processor of hypotheses representing a possible organizational structure of a criminal activity, said criminal transaction database comprising one of a similarity-based and a nearest neighbor search; and
  applying at least one model to results returned from the database in response to a query, the query requesting objects comprising criminal activity data in said criminal transaction database most similar to a target object comprising suspicious criminal activity data, the queried objects, responsive to the query, being most similar to each others, and
  applying multivariate statistical analysis and clustering to determine a tree-structured index for indexing and searching the transaction database to retrieve the objects most similar to the target objects;
  the testing including testing at least one hypothesis of a possible organizational structure comprising one of an individual offender and a group of individual offenders and detecting the pattern of the criminal activity; the pattern detection comprising a prediction of attributes including two of gender, marital status, occupation and age of an offender of the criminal transaction to predict the criminal profile.

31. The method of claim 30, the model comprising one of a Bayesian model and a belief network, the model comprising a graph of hypothetical relationships between objects responsive to the query.

32. The method of claim 30 further comprising performing a search of the transaction database against itself to determine a list of most similar clusters.

33. The method of claim 32 further comprising adding data to the criminal transaction database comprising one of metadata of the most similar clusters and identification of the list of most similar clusters.

34. The method of claim 30 further comprising predicting a criminal profile of one of an individual offender and an entity engaged in an illicit enterprise.

35. The method of claim 30, the method further comprising predicting one of a type of material used to accelerate a fire and a type of carried weapon in combination with predicting the criminal profile.

36. The method of claim 30, the hypotheses of a possible organizational structure comprising first and second hypothesis comprising first and second likelihoods of one of an individual offender and a group of individual offenders, the set of first and second likelihoods comprising a likelihood ratio.

37. The method of claim 30 further comprising predicting a property responsive to the query of the criminal transaction database, the predicted property being one of a likelihood, a probability and a belief that a target object and retrieved objects comprising criminal activity data responsive to the query satisfy a postulated relationship across alternative hypotheses of a possible organizational structure.

38. The method of claim 37, the predicted property being a likelihood, the method further comprising expressing the alternative hypotheses of possible organizational structure as a likelihood ratio.

39. The method of claim 30, the nearest neighbor search comprising a similarity measure and a search by said similarity measure of the criminal transaction database.

40. The method of claim 30, the possible organizational structure of the similar criminal activity data comprising a single criminal perpetrator.

41. The method of claim 30 further comprising clustering of the criminal activity data of the criminal transaction database to recognize clustering of fire combustion products and a man-made fire to predict a criminal profile of an arsonist.

42. The method of claim 30 further comprising a plurality of databases, the plurality of databases including the criminal transaction database, a spectral property database comprising electromagnetic and acoustic data, a micro-body assemblage database comprising charcoal and fossil data and an image database, the method further comprising predicting one of a source, an origin and a location of one of an object comprising criminal activity data responsive to the query with reference to the criminal transaction database, the spectral property database, the micro-body assemblage database or the image database.

43. The method of claim 30 wherein the plurality of databases comprises criminal activity data indexed by frequency.

44. The method of claim 43 wherein the criminal activity data indexed by frequency comprises time-of-day, day-of-week and instance of one of a new moon and a full moon.

45. A method of predicting one of a fraudulent activity and a criminal activity event via receiving a query to search manager apparatus coupled to a plurality of databases comprising a core transaction database of property data for objects comprising one of criminal and fraudulent transaction data, the processor search manager apparatus comprising a processor and memory, the method comprising:
  determining a set of objects comprising transaction data most similar to a target object comprising suspicious transaction data via said processor search manager apparatus responsive to a query of the plurality of databases for similar objects to the target object,
  applying multivariate statistical analysis and clustering to determine a tree-structured index for indexing and searching the plurality of databases to retrieve the objects most similar to the target objects;
  applying at least one model to predict a property of the target object,
  comparing hypothetical relationships involving the target object and a subset of a set of similar objects to the target object using one of likelihoods, probabilities and beliefs, the hypothetical relationships comprising an organizational structure for the fraudulent activity or the criminal activity event,
  determining a probable relationship and a property value of the target object in relation to the similar set of objects, and
  predicting an occurrence of one of the fraudulent activity and the criminal activity event responsive to said determined probable relationship and property value of the target object.

46. The method as recited in claim 45 wherein the core database comprises a financial transaction database.

47. The method as recited in claim 46, predicting an occurrence of fraudulent activity comprising predicting an instance of medical insurance fraud by one of a consumer and an enterprise responsive to a query of the financial transaction database.

48. The method as recited in claim 46 wherein a financial transaction of the financial transaction database comprises a medical record of a consumer of medical services for predicting a pattern of fraudulent activity by one of the consumer and an enterprise.

49. The method as recited in claim 46 further comprising mining financial transaction information stored in the financial transaction database to identify a cluster representing a similar behavior including a purchasing pattern of one of a consumer and an enterprise.

50. The method as recited in claim 45 wherein the core database comprises a criminal transaction database, the criminal transaction database comprising crime and offender records.

51. The method as recited in claim 50 further comprising adding data to the criminal transaction database comprising one of metadata of most similar clusters and identification of a list of most similar clusters, the metadata comprising date, time and location data of the crime and offender records.

52. The method as recited in claim 45, a hypothetical relationship being an organizational structure hypothesis comprising interactions among a plurality of communications devices forming nodes of a communication network between or among consumers and an enterprise.

* * * * *